US011942813B2

United States Patent
Suzuki et al.

(10) Patent No.: US 11,942,813 B2
(45) Date of Patent: Mar. 26, 2024

(54) BATTERY-SYSTEM CONTROL METHOD AND BATTERY SYSTEM

(71) Applicant: Murata Manufacturing Co., Ltd., Nagaokakyo (JP)

(72) Inventors: Tatsuya Suzuki, Nagaokakyo (JP); Michiya Mori, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/985,983

(22) Filed: Nov. 14, 2022

(65) Prior Publication Data

US 2023/0076747 A1  Mar. 9, 2023

Related U.S. Application Data

(63) Continuation of application No. PCT/JP2021/018482, filed on May 14, 2021.

(30) Foreign Application Priority Data

May 22, 2020 (JP) .................. 2020-089606

(51) Int. Cl.
*H02J 7/00* (2006.01)
*H01M 10/42* (2006.01)
*H01M 10/48* (2006.01)

(52) U.S. Cl.
CPC ....... *H02J 7/00714* (2020.01); *H01M 10/425* (2013.01); *H01M 10/482* (2013.01);
(Continued)

(58) Field of Classification Search
CPC .... H02J 7/00714; H02J 7/0013; H02J 7/0048; H02J 7/0063; H02J 7/0047; H02J 7/005;
(Continued)

(56) References Cited

U.S. PATENT DOCUMENTS

| | | | |
|---|---|---|---|
| 2011/0291619 A1* | 12/2011 | Asakura | H01M 10/441 320/134 |
| 2012/0242344 A1* | 9/2012 | Ishishita | B60L 50/16 324/430 |
| 2017/0141589 A1* | 5/2017 | Inoue | H02J 7/0068 |

FOREIGN PATENT DOCUMENTS

| | | |
|---|---|---|
| JP | 2004120855 A | 4/2004 |
| JP | 2016149863 A | 8/2016 |
| WO | 2011055499 A1 | 5/2011 |

OTHER PUBLICATIONS

International Search Report in PCT/JP2021/018482, dated Jul. 27, 2021, 3 pages.

(Continued)

*Primary Examiner* — Jared Fureman
*Assistant Examiner* — Michael J Warmflash
(74) *Attorney, Agent, or Firm* — Keating & Bennett, LLP

(57) ABSTRACT

When a module controller of a battery system detects an abnormality of a battery module, the module controller selects the battery module without stopping the battery module. After that, the module controller compares a current value of a current supplied to a load, with a total value of rated currents of all battery modules that are normal and that are supplying power to the load. When the current value of the current supplied to the load is greater than the total value of the rated currents of the battery modules, the module controller performs a control to stop all the battery modules. When the current value of the current supplied to the load is less than or equal to the total value of the rated currents of all the battery modules that are supplying power to the load, the module controller performs a control to stop the abnormal battery module and not to stop the normal battery modules.

20 Claims, 12 Drawing Sheets

(52) U.S. Cl.
CPC ......... *H01M 10/486* (2013.01); *H02J 7/0013* (2013.01); *H02J 7/0048* (2020.01); *H02J 7/0063* (2013.01); *H01M 2220/10* (2013.01)

(58) Field of Classification Search
CPC .......... H02J 7/00; H02J 7/007194; H02J 7/34; H01M 10/425; H01M 10/482; H01M 10/486; H01M 2220/10; H01M 10/441; H01M 10/443; H01M 2010/4271; H01M 10/44; H01M 10/48; Y02E 60/10; H02H 7/18
See application file for complete search history.

(56) References Cited

OTHER PUBLICATIONS

Written Opinion in PCT/JP2021/018482, dated Jul. 27, 2021, 4 pages.

* cited by examiner

BATTERY-SYSTEM CONTROL METHOD AND BATTERY SYSTEM

CROSS REFERENCE TO RELATED APPLICATIONS

This application claims the benefit of priority to Japanese Patent Application No. 2020-089606 filed on May 22, 2020 and is a Continuation application of PCT Application No. PCT/JP2021/018482 filed on May 14, 2021. The entire contents of each application are hereby incorporated herein by reference.

BACKGROUND OF THE INVENTION

1. Field of the Invention

The present invention relates to a battery-system control method and a battery system.

2. Description of the Related Art

There is proposed a power-supply device which includes multiple assembled batteries which are connected in parallel to each other and each of which has multiple nickel-hydrogen batteries connected in series to each other, charge control means for controlling charge of the assembled batteries, discharge control means for controlling discharge of the assembled batteries, and battery monitoring means for calculating the remaining capacities of the assembled batteries and monitoring the states of the assembled batteries (for example, see Japanese Unexamined Patent Application Publication No. 2004-120855). In the power-supply device, when at least one assembled battery among the assembled batteries has a remaining capacity less than or equal to a first remaining capacity value, the battery monitoring means causes the charge control means to start to charge the at least one assembled battery. In contrast, when at least one assembled battery among the assembled batteries has a remaining capacity less than or equal to a second remaining capacity value lower than the first remaining capacity value, the battery monitoring means causes the discharge control means to stop discharge from the at least one assembled battery.

SUMMARY OF THE INVENTION

However, in the power-supply device described in Japanese Unexamined Patent Application Publication No. 2004-120855, when discharge from at least one assembled battery among the assembled batteries is stopped, the remaining assembled batteries supply power to a load. In this case, with an increase of discharge power of the remaining assembled batteries, an excessive discharge current may flow from the remaining assembled batteries to a power switch device included in the discharge control means. This may cause application of stress to the power switch device, resulting in a breakdown of the power switch device.

Preferred embodiments of the present invention provide battery-system control methods and battery systems, each of which reduce or prevent a breakdown of a battery module.

A battery-system control method according to an aspect of a preferred embodiment of the present invention is a control method for a battery system including a module controller to control multiple battery modules capable of supplying power to a load. The control is performed to operate or stop the power supply. The module controller monitors, for each of the battery modules, whether the battery module is abnormal or normal, based on at least one of the voltage value of a battery included in the battery module, the SOC value of the battery indicating the state of charge, or the temperature of the battery. In response to detection of an abnormality, the module controller selects a battery module having the abnormality, without stopping the abnormal battery module. After the selection, the module controller compares the current value of a current supplied to the load, with the total value of rated currents of all battery modules that are normal and that are supplying power to the load. When the current value of the current supplied to the load is greater than the total value of the rated currents of all the battery modules that are supplying power to the load, the module controller performs control to stop all the battery modules. When the current value of the current supplied to the load is less than or equal to the total value of the rated currents of all the battery modules that are supplying power to the load, the module controller performs control to stop the abnormal battery module and not to stop the normal battery modules.

In a battery-system control method according to an aspect of a preferred embodiment of the present invention, when it is determined that a battery module including a battery with a voltage value below a preset first voltage threshold is present among the battery modules, the module controller may determine the battery module including the battery with the voltage value below the first voltage threshold to be abnormal.

In a battery-system control method according to an aspect of a preferred embodiment of the present invention, when it is determined that a battery module including a battery with a voltage value below a preset second voltage threshold larger than the first voltage threshold is present among the battery modules, if the current value of the current supplied to the load is less than or equal to the total value of the rated currents of all the battery modules other than the battery module including the battery with the voltage value below the first voltage threshold, the module controller may perform control to stop the abnormal battery module and not to stop the normal battery modules.

In a battery-system control method according to an aspect of a preferred embodiment of the present invention, based on the temperatures of batteries included in the battery modules, when at least one battery module among the battery modules includes a battery with a temperature exceeding a preset temperature threshold, the module controller may determine the at least one battery module including the battery with the temperature exceeding the temperature threshold to be abnormal.

In a battery-system control method according to an aspect of a preferred embodiment of the present invention, based on the SOC values of batteries included in the battery modules, when at least one battery module among the battery modules includes an SOC value which is below a preset SOC threshold, the module controller may determine that the at least one battery module with the SOC value which is below the preset SOC threshold to be abnormal.

A battery system according to an aspect of a preferred embodiment of the present invention in a different viewpoint includes battery modules capable of supplying power to a load, and a module controller configured or programmed to control the battery modules to execute or stop the power supply. The module controller is configured or programmed to monitor, for each of the battery modules, whether the battery module is abnormal or normal, based on at least one of the voltage value of a battery included in the battery module, the SOC value indicating the state of charge of the battery, or the temperature of the battery. In response to detection of an abnormality, the module controller is configured or programmed to select a battery module with the abnormality, without stopping the abnormal battery module. After the selection, the module controller is configured or programmed to compare the current value of a current supplied to the load, with the total value of rated currents of all battery modules that are normal and that are supplying power to the load. When the current value of the current supplied to the load is greater than the total value of the rated currents of all the battery modules that are supplying power to the load, the module controller is configured or programmed to perform control to stop all the battery modules. When the current value of the current supplied to the load is less than or equal to the total value of the rated currents of all the battery modules that are supplying power to the load, the module controller is configured or programmed to perform control to stop the abnormal battery module and not to stop the normal battery modules.

In a battery system according to an aspect of a preferred embodiment of the present invention, when at least one battery module among the battery modules includes a battery with a voltage value below a preset first voltage threshold, the module controller may determine the at least one battery module including the battery with the voltage value below the first voltage threshold to be abnormal. When it is determined that a battery module including a battery with a voltage value below a preset second voltage threshold larger than the first voltage threshold is present among the battery modules, if the current value of the current supplied to the load is less than or equal to the total value of the rated currents of all the battery modules other than the battery module having the battery whose voltage value is below the first voltage threshold, the module controller may perform control to stop the abnormal battery module and not to stop the normal battery modules.

In a battery system according to an aspect of a preferred embodiment of the present invention, based on the temperatures of batteries included in the battery modules, when at least one battery module among the battery modules includes a battery with a temperature exceeding a preset temperature threshold, the module controller may determine the at least one battery module including the battery with the temperature exceeding the temperature threshold to be abnormal.

In a battery system according to an aspect of a preferred embodiment of the present invention, based on the SOC values of batteries included in the battery modules, when at least one battery module among the battery modules has an SOC value which is below a preset SOC threshold, the module controller may determine the at least one battery module including the SOC value which is below the preset SOC threshold to be abnormal.

In a preferred embodiment of the present invention, the module controller is configured or programmed to monitor, for each of multiple battery modules, whether the battery module is abnormal or normal, based on at least one of the following types of information of the battery included in each of the battery modules: the voltage value, the SOC value indicating the state of charge, and the temperature. In response to detection of an abnormality, the module controller is configured or programmed to select a battery module with the abnormality, without stopping the abnormal battery module. After that, the module controller is configured or programmed to compare the current value of the current supplied to a load, with the total value of the rated currents of all battery modules that are normal and that are supplying power to the load. When the current value of the current supplied to the load is greater than the total value of the rated currents of all the battery modules that are supplying power to the load, the module controller is configured or programmed to perform control to stop all the battery modules. When the current value of the current supplied to the load is less than or equal to the total value of the rated currents of all the battery modules that are supplying power to the load, the module controller is configured or programmed to perform control to stop the abnormal battery modules and not to stop the normal battery modules. Such control does not cause application of excessive stress caused by an increase of power supplied by the running battery modules other than the stopped battery modules, thus reducing or preventing breakdowns of the battery modules due to the excessive stress.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
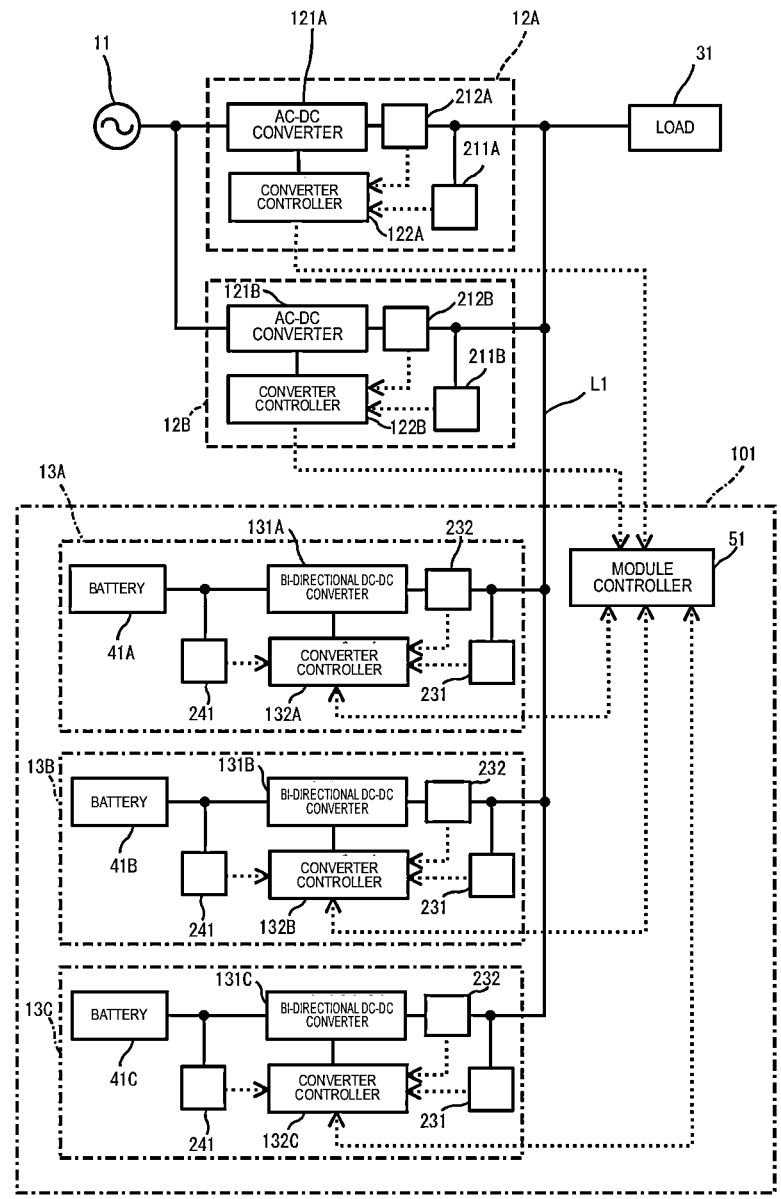
FIG. 1 is a block diagram illustrating a power supply system according to a first preferred embodiment of the present invention.

Preferred embodiments of the present invention will be described in detail below by referring to the drawings. A battery system according to the present preferred embodiment includes multiple battery modules which are capable of supplying power to a load, and a module controller configured or programmed to control power supply to the load from the battery modules or control stopping of the power supply. The module controller monitors, for each of the battery modules, whether the battery module is abnormal or normal, based on at least one of the following types of information of the battery included in each of the battery modules: the voltage value, the SOC value indicating the state of charge, and the temperature. In response to detection of an abnormality, the module controller selects a battery module having the abnormality, without stopping the abnormal battery module. After that, the module controller compares the current value of a current supplied to the load, with the total value of the rated currents of all the battery modules that are normal and that are supplying power to the load. If the current value of the current supplied to the load is greater than the total value of the rated currents of all the battery modules that supply power to the load, the module controller performs control to stop all the battery modules. If the current value of the current supplied to the load is less than or equal to the total value of the rated currents of all the battery modules that are supplying power to the load, the module controller performs control to stop the abnormal battery modules and not to stop the normal battery modules.

A power supply system according to the present preferred embodiment is usable, for example, to supply power to a server which needs backup power supply in case of power failure. As illustrated in FIG. 1, the power supply system according to the present preferred embodiment includes two power supply modules 12A and 12B and a battery system 101. The two power supply modules 12A and 12B and the battery system 101 are connected to a load 31 to which power is supplied from the power supply modules 12A and 12B and the battery system 101. The load 31 is, for example, a blade server which allows removable accommodation in a single cabinet.

The power supply modules 12A and 12B, which include AC-DC converters 121A and 121B, respectively, and converter controllers 122A and 122B, respectively, which control operations of the AC-DC converters 121A and 121B, output a preset constant voltage to the load 31. The voltage, which is output to the load 31, is set based on the input rated voltage of the load 31, and is set, for example, to 12 V. The AC-DC converters 121A and 121B are connected in parallel between a system power supply 11 and the load 31. The AC-DC converters 121A and 121B each include a transformer, a rectifier smoothing circuit, and a power conversion circuit which includes a switching device and which increases or decreases the voltage. The power supply modules 12A and 12B include voltage detectors 211A and 211B, respectively, which detect the output voltages of the AC-DC converters 121A and 121B, and current detectors 212A and 212B, respectively, which detect output currents.

The converter controllers 122A and 122B, which are, for example, microcomputers each including an internal clock, correspond to the two AC-DC converters 121A and 121B, respectively. The converter controllers 122A and 122B perform constant voltage control on the AC-DC converters 121A and 121B through control of operations of the switching devices of the power conversion circuits of the AC-DC converters 121A and 121B. Thus, each of the AC-DC converters 121A and 121B changes, rectifies, and smooths the voltage of an alternating current (for example, about 200 V) supplied from the system power supply 11, and then decreases the voltage to change the decreased voltage to a direct-current voltage (for example, about 12 V) for supply to the load 31. The converter controllers 122A and 122B output, to the battery system 101, output-current information indicating the current values of currents that are output from the AC-DC converters 121A and 121B, which are control targets, to the load 31. For example, in case of power failure of the system power supply 11, the converter controllers 122A and 122B output stop-notification information to the battery system 101 when the AC-DC converters 121A and 121B are to be stopped.

For example, the current detectors 212A and 212B each detect the voltage across both the ends of a resistor (not illustrated) connected in series between the corresponding one of the AC-DC converters 121A and 121B and the load 31. Thus, the current detectors 212A and 212B detect the current values of the output currents of the AC-DC converters 121A and 121B. Then, the voltage detectors 212A and 212B output, to the converter controllers 122A and 122B, the voltages proportional to the detected output currents. The voltage detectors 211A and 211B each detect the difference voltage between the voltage, which is obtained by dividing, in a certain division ratio, the voltage occurring at the output end of the corresponding one of the power supply modules 12A and 12B, and the reference voltage which is preset based on the specification of the load 31. The voltage detectors 211A and 211B output, to the converter controllers 122A and 122B, voltages corresponding to the detected difference voltages. The converter controllers 122A and 122B control operations of the AC-DC converters 121A and 121B so that the output voltages of the AC-DC converters 121A and 121B are maintained at constant voltages corresponding to the reference voltage, based on the difference voltages received from the voltage detectors 211A and 211B.

The battery system 101 includes three battery modules 13A, 13B, and 13C, and a module controller 51 which controls power supply from the battery modules 13A, 13B, and 13C to the load 31 and controls stopping of the power supply. The battery modules 13A, 13B, and 13C are connected to the load 31 and the power supply modules 12A and 12B through a common power line L1. The battery modules 13A, 13B, and 13C includes batteries 41A, 41B, and 41C, respectively, bi-directional DC-DC converters 131A, 131B, and 131C, respectively, converter controllers 132A, 132B, and 132C, respectively, which control operations of the bi-directional DC-DC converters 131A, 131B, and 131C, current detectors 232, and voltage detectors 231 and 241. The batteries 41A, 41B, and 41C, which are, for example, lithium ion batteries or redox-flow batteries, output, for example, direct-current voltages from about 35 V to about 59 V. The batteries 41A, 41B, and 41C are obtained, for example, by electrically connecting multiple tubular batteries each having electrodes in both the end portions in the tube axis direction.

The bi-directional DC-DC converters 131A, 131B, and 131C, each having a switching device, increase or decrease voltages. The bi-directional DC-DC converters 131A, 131B, and 131C operate in the discharge mode or the charge mode. The discharge mode is a mode in which currents, which are output from the batteries 41A, 41B, and 41C, are supplied to the load 31. The charge mode is a mode in which the batteries 41A, 41B, and 41C are charged with power supplied from the power supply modules 12A and 12B. The converter controllers 132A, 132B, and 132C, which are, for example, microcomputers each including an internal clock, control operations of the switching devices of the bi-directional DC-DC converters 131A, 131B, and 131C. The converter controllers 132A, 132B, and 132C perform PWM control on the bi-directional DC-DC converters 131A, 131B, and 131C. For example, when the power supply modules 12A and 12B supply power to the load 31, the converter controllers 132A, 132B, and 132C cause the bi-directional DC-DC converters 131A, 131B, and 131C to operate in the charge mode. In contrast, when discharge-instruction information is received from the module controller 51 described below, the converter controllers 132A, 132B, and 132C cause the bi-directional DC-DC converters 131A, 131B, and 131C to operate in the discharge mode. At that time, the converter controllers 132A, 132B, and 132C perform constant voltage control on the bi-directional DC-DC converters 131A, 131B, and 131C so that a constant voltage is output to the load 31. Further, when stop-instruction information is received from the module controller 51 described below, the converter controllers 132A, 132B, and 132C stop the bi-directional DC-DC converters 131A, 131B, and 131C.

For example, each current detector 232 detects the voltage which occurs between both the ends of a resistor (not illustrated) connected in series between the corresponding one of the bi-directional DC-DC converters 131A, 131B, and 131C and the load 31. Thus, each current detector 232 detects the current value of an output current or an input current of the corresponding one of the bi-directional DC-DC converters 131A, 131B, and 131C. Then, each current detector 232 outputs, to the corresponding one of the converter controllers 132A, 132B, and 132C, a voltage proportional to the detected output current.

For example, each voltage detector 231 detects the difference voltage between the voltage, which is obtained by dividing, in a certain division ratio, the voltage occurring at the output end of the corresponding one of the battery modules 13A, 13B, and 13C, and the reference voltage which is preset based on the specification of the load 31. Then, each voltage detector 231 outputs, to the corresponding one of the converter controllers 132A, 132B, and 132C, a voltage corresponding to the detected difference voltage. When the bi-directional DC-DC converters 131A, 131B, and 131C are to operate in the discharge mode, the converter controllers 132A, 132B, and 132C control operations of the bi-directional DC-DC converters 131A, 131B, and 131C so that the output voltages of the bi-directional DC-DC converters 131A, 131B, and 131C are maintained at a constant voltage corresponding to the reference voltage described above, based on the difference voltages which are received from the voltage detectors 231.

Each voltage detector 241 detects the voltage, that is, the battery voltage, occurring between the output end of the corresponding one of the batteries 41A, 41B, and 41C. As a voltage detector 241, for example, a detector including a voltage sensor is used. The voltage sensor, which is connected in common to the electrodes of the batteries included in the corresponding one of the batteries 41A, 41B, and 41C and which is connected to its positive-side tab and its negative-side tab, measures the voltage occurring between the positive-side tab and the negative-side tab. Each voltage detector 241 outputs, to the corresponding one of the converter controllers 132A, 132B, and 132C, a detected-voltage signal indicating the detected voltage. The converter controllers 132A, 132B, and 132C generate battery-voltage information, indicating the battery voltages of the batteries 41A, 41B, and 41C, from the detected-voltage signals received from the voltage detectors 241, and output the generated battery-voltage information to the module controller 51.

Figure 2:
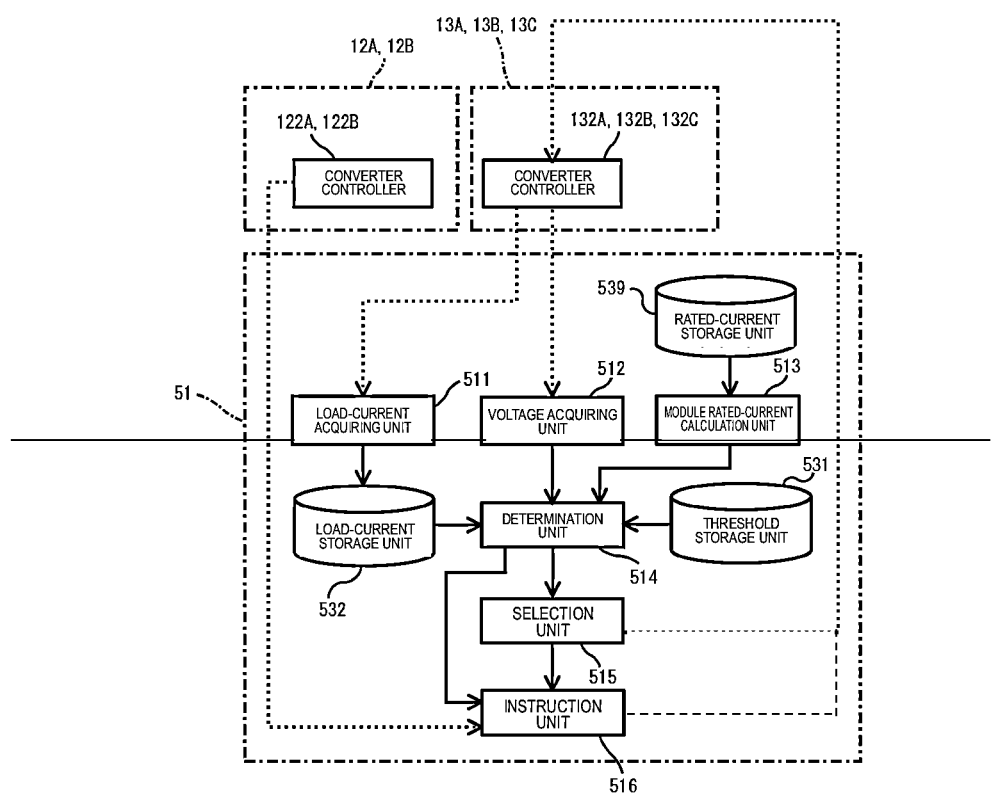
FIG. 2 is a functional block diagram illustrating a module controller according to the first preferred embodiment of the present invention.

Upon reception of the stop-notification information, which is described above, from the converter controllers 122A and 122B of the power supply modules 12A and 12B, the module controller 51 outputs, to the converter controllers 132A, 132B, and 132C, discharge-instruction information for instructing the bi-directional DC-DC converters 131A, 131B, and 131C of the battery modules 13A, 13B, and 13C to operate in the discharge mode. Then, the module controller 51 selects, from the batteries 41A, 41B, and 41C, a battery module (for example, the battery module 13A) having a battery (for example, the battery 41A) whose battery voltage is below a preset first voltage threshold, based on the battery-voltage information received from the converter controllers 132A, 132B, and 132C. The condition that a battery voltage is below the first voltage threshold corresponds to the first stop condition for the battery modules 13A, 13B, and 13C. The first voltage threshold may be set, for example, so as to indicate a voltage which is below the voltage corresponding to about 10% of the maximum rated voltage of each of the batteries 41A, 41B, and 41C. Assume that the current value of a load current required to be supplied to the load 31 exceeds the total current value of the rated currents of the battery modules 13B and 13C belonging to a battery module group, which is supplying power to the load 31, of all the other battery modules, excluding the battery module 13A, among the battery modules 13A, 13B, and 13C. In this case, the module controller 51 controls the converter controllers 132A, 132B, and 132C so that the power supply to the load 31 from the battery modules 13A, 13B, and 13C is stopped. The condition that the current value of a load current required to be supplied to the load 31 exceeds the total current value of the rated currents of all the other battery modules, excluding those with battery voltages below the first voltage threshold, among the battery modules 13A, 13B, and 13C corresponds to the second stop condition for the battery modules 13A, 13B, and 13C. The module controller 51 includes a processor and a memory. The processor runs programs stored in the memory. Thus, as illustrated in FIG. 2, the module controller 51 functions as a load-current acquiring unit 511, a voltage acquiring unit 512, a module rated-current calculation unit 513, a determination unit 514, a selection unit 515, and an instruction unit 516. The memory includes a threshold storage unit 531 which stores information indicating the first voltage threshold, a load-current storage unit 532 which stores load-current information indicating the current value of a current required to be supplied to the load 31, and a rated-current storage unit 539 which stores rated-current information indicating the rated current values of the battery modules 13A, 13B, and 13C. The first voltage threshold is set, for example, to a voltage of about 60% with respect to the battery voltages of the batteries 41A, 41B, and 41C in full charge.

While the bi-directional DC-DC converters 131A, 131B, and 131C of the battery modules 13A, 13B, and 13C operate in the discharge mode, the load-current acquiring unit 511 repeatedly generates load-current information at a preset time interval based on the output-current information received from the converter controllers 132A, 132B, and 132C, and stores the generated information in the load-current storage unit 532.

The voltage acquiring unit 512 acquires the battery-voltage information received from the converter controllers 132A, 132B, and 132C, and notifies the determination unit 514 of the voltage values indicated by the acquired battery-voltage information. The module rated-current calculation unit 513 refers to the rated-current information of some of the battery modules 13A, 13B, and 13C which is stored in the rated-current storage unit 539 to calculate the total current value of the rated currents of some of the battery modules 13A, 13B, and 13C, and notifies the determination unit 514 of the calculated total current value.

The determination unit 514 monitors, for each of the battery modules 13A, 13B, and 13C, whether the battery module is abnormal or normal, based on the voltage values of the battery voltages of the batteries 41A, 41B, and 41C included in the battery modules 13A, 13B, and 13C, respectively. The determination unit 514 determines whether a battery having a battery voltage which is below the first voltage threshold is present among the batteries 41A, 41B, and 41C included in the battery modules 13A, 13B, and 13C, respectively, based on the voltage values of the battery voltages notified from the voltage acquiring unit 512. The determination unit 514 obtains load-current information stored in the load-current storage unit 532, and determines whether the current value indicated by the load-current information exceeds the total current value of the rated currents of the battery modules 13A, 13B, and 13C other than the battery modules each having the corresponding one of the batteries 41A, 41B, and 41C having a battery voltage which is below the first voltage threshold.

If the determination unit 514 determines that a battery having a battery voltage which is below the first voltage threshold is present among the batteries 41A, 41B, and 41C included in the battery modules 13A, 13B, and 13C, respectively, that is, if the determination unit 514 determines that an abnormal battery module is present among the battery modules 13A, 13B, and 13C, the selection unit 515 selects such a battery module among the battery modules 13A, 13B, and 13C as a first battery module.

For example, when the power supply modules 12A and 12B are operating, the instruction unit 516 outputs, to the converter controllers 132A, 132B, and 132C, charge-instruction information for instructing the bi-directional DC-DC converters 131A, 131B, and 131C of the battery modules 13A, 13B, and 13C to operate in the charge mode. Upon reception of the stop-notification information, described above, from the converter controllers 122A and 122B of the power supply modules 12A and 12B, the instruction unit 516 outputs, to the converter controllers 132A, 132B, and 132C, discharge-instruction information for instructing the bi-directional DCDC converter 131A, 131B, 131C to operate in the discharge mode. Thus, the converter controllers 132A, 132B, and 132C operate the bi-directional DC-DC converters 131A, 131B, and 131C in the discharge mode, and power is supplied from the batteries 41A, 41B, and 41C to the load 31. If the determination unit 514 determines that the current value indicated by the load-current information exceeds the total current value of the rated currents of battery modules, other than the first battery module, among the battery modules 13A, 13B, and 13C, the instruction unit 516 outputs stop-instruction information for instructing the battery modules 13A, 13B, and 13C to stop.

Figure 3:
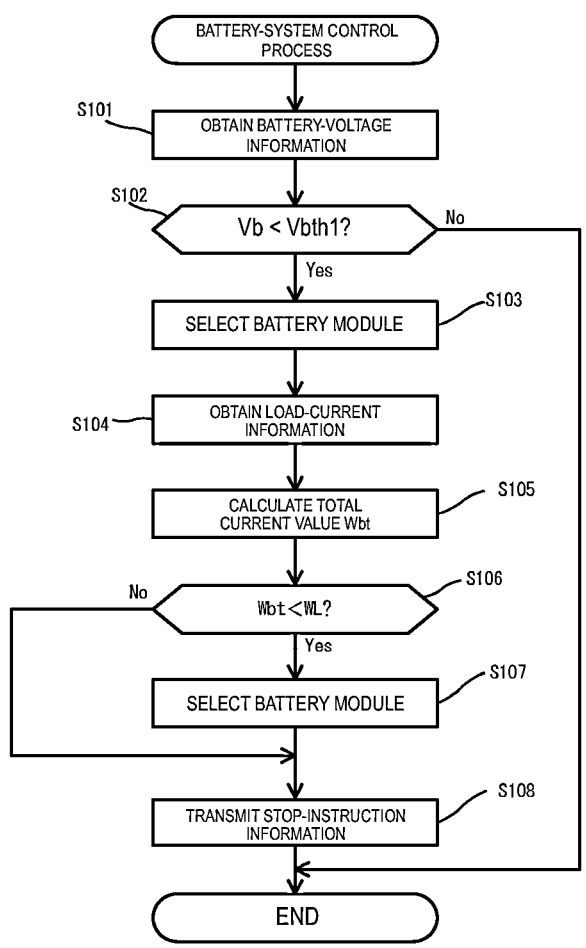
FIG. 3 is a flowchart of an exemplary battery-system control process performed by a module controller according to the first preferred embodiment of the present invention.

A battery-system control process performed by the module controller 51 according to the present preferred embodiment will be described by referring to FIG. 3. The battery-system control process is repeatedly performed at a preset processing cycle. The processing cycle is set, for example, about 1 msec. The voltage acquiring unit 512 acquires battery-voltage information from each of the converter controllers 132A, 132B, and 132C of the battery modules 13A, 13B, and 13C (step S101). At that time, the voltage acquiring unit 512 notifies the determination unit 514 of voltage values indicated by the acquired battery-voltage information.

The determination unit 514 determines whether a battery module including a battery voltage with a voltage value Vb is below the first voltage threshold Vbth1 is present (step S102). As described below in second and third preferred embodiments, the determination unit may further determine whether a battery module having a temperature exceeding a preset temperature threshold is present among the battery modules 13A, 13B, and 13C, or may further determine whether a battery having an SOC value which is below a preset SOC threshold is present among the batteries 41A, 41B, and 41C.

If the determination unit 514 determines that all the voltage values Vb of the battery voltages of the batteries 41A, 41B, and 41C are greater than or equal to the first voltage threshold Vbth1 (step S102: No), the battery-system control process ends. In contrast, assume that the determination unit 514 determines that a battery having a battery voltage whose voltage value Vb is below the first voltage threshold Vbth1 is present among the batteries 41A, 41B, and 41C (step S102: Yes). In this case, the selection unit 515 selects a battery module (for example, the battery module 13A) having a battery (for example, the battery 41A) whose battery voltage is determined by the determination unit 514 to be below the first voltage threshold (step S103). In the series of processes in step S102 and step S103, the determination unit 514 determines whether a battery module satisfying the first stop condition is present among the battery modules 13A, 13B, and 13C, and the selection unit 515 selects the battery modules satisfying the first stop condition. At the time point of the end of step S103, the battery module 13A is not stopped. Thus, in the series of processes in step S102 and step S103, a battery module (for example, the battery module 13A) that is to be stopped is selected. Assume that the battery module 13B and the battery module 13C are supplying power to the load 31.

After that, the determination unit 514 obtains load-current information stored in the load-current storage unit 532 (step S104). The module rated-current calculation unit 513 calculates the total current value Wbt of the rated currents of all the battery modules (in this case, the battery module 13B and the battery module 13C), which are supplying power to the load 31 and which are other than the battery module 13A selected by the selection unit 515 in step S103 (step S105). At that time, the module rated-current calculation unit 513 notifies the determination unit 514 of the calculated total current value Wbt. The determination unit 514 determines whether the current value WL indicated by the obtained load-current information exceeds the total current value Wbt of the rated currents of the battery modules 13B and 13C (step S106). The condition that the current value WL indicated by the load-current information exceeds the total current value Wbt of the rated currents of the battery modules 13B and 13C is the second stop condition. Assume that the determination unit 514 determines that the current value WL indicated by the load-current information is less than or equal to the total current value Wbt of the rated currents of the battery modules 13B and 13C (step S106: No). In this case, the selection unit 515 does not select any battery modules, and the process in step S108, which is described below, is performed.

In contrast, assume that the determination unit 514 determines that the current value WL indicated by the load-current information exceeds the total current value Wbt of the rated currents of the battery modules 13B and 13C (step S106: Yes). In this case, the selection unit 515 selects all the battery modules (in this case, the battery module 13B and the battery module 13C), which have supplied power to the load in step 1 and which are other than the battery module 13A selected by the selection unit 515 in step S103 (step S107). The battery modules (in this case, the battery module 13B and the battery module 13C) selected in the series of processes from step S104 to step S107 are not stopped at this time point.

After that, the instruction unit 516 collectively transmits the stop-instruction information to all the battery modules selected in step S103 and step S107 (step S108), and the battery-system control process ends. At the time point of execution of the series of processes in step S102 and step S103, for example, if the battery module 13B does not supply power to the load 31, in step S105, the module rated-current calculation unit 513 excludes the rated current of the battery module 13B and calculates the current value of the rated current of the battery module 13C as the total current value Wbt.

As described above, in the battery system 101 according to the present preferred embodiment, in the series of processes in step S102 and step S103, a battery module (for example, the battery module 13A) having the corresponding one of the batteries 41A, 41B, and 41C whose battery voltage is below the first voltage threshold is selected from the battery modules 13A, 13B, and 13C. When the current value indicated by the load-current information exceeds the total current value of the rated currents of all the battery modules 13B and 13C, which have supplied power to the load 31 and which are other than the battery module 13A, among the battery modules 13A, 13B, and 13C, the battery modules 13B and 13C are selected. The instruction unit 516 collectively transmits the stop-instruction information to all the battery modules, which are selected by the selection unit 515, to stop power supply to the load 31. Thus, collective transmission of the stop-instruction information for stopping battery modules causes application of excessive stress to the battery modules 13A, 13B, and 13C to be reduced or prevented, causing reduction or prevention of breakdowns of the battery modules 13A, 13B, and 13C due to the excessive stress.

When the batteries 41A, 41B, and 41C are stopped due to an excessive discharge current flowing from the batteries 41A, 41B, and 41C, a user of the battery system needs to check, for example, if the batteries 41A, 41B, and 41C and their peripheral circuits are abnormal. In contrast, in the battery system 101 according to the present preferred embodiment, when an excessive discharge current is expected to flow from the batteries 41A, 41B, and 41C, that is, when the current value indicated by the load-current information exceeds the total current value of the rated currents of all the battery modules 13B and 13C, other than the battery module 13A, among the battery modules 13A, 13B, and 13C, discharge from the batteries 41A, 41B, and 41C is stopped, resulting in no occurrence of an excessive discharge current in the battery modules 13B and 13C. Thus, the check for abnormality is not necessary in restart of the batteries 41A, 41B, and 41, achieving a reduction of the MTTR (mean time to recovery) of the battery modules 13A, 13B, and 13C.

Second Preferred Embodiment

A battery system according to the present preferred embodiment is different from that of the first preferred embodiment in that each of the battery modules includes a temperature detector which detects the temperature of the battery module. When a first battery module which has a battery voltage exceeding the preset first voltage threshold or has a temperature exceeding a preset temperature threshold is present among the battery modules, a module controller according to the present preferred embodiment selects the first battery module. The module controller regards, as a second battery module, a battery module, whose battery voltage is below a preset second voltage threshold which is higher than the first voltage threshold, in a battery module group which is a group of all the battery modules, among the battery modules, that are supplying power to a load and that are other than the first battery module. When the current value of a current required to be supplied to the load exceeds the total current value of the rated currents of the battery modules, other than the second battery module, in the battery module group, the module controller selects all the battery modules belonging to the battery module group. The module controller stops power supply to the load from all the selected battery modules.

Figure 4:
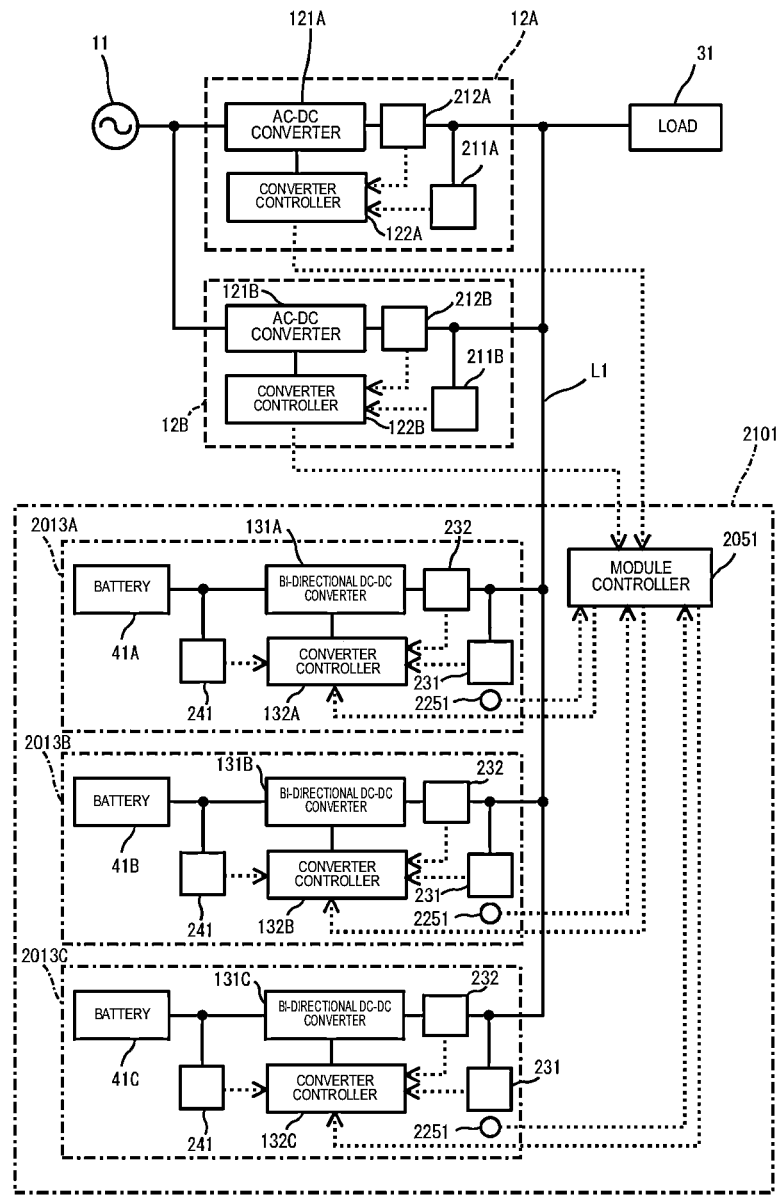
FIG. 4 is a block diagram illustrating a power supply system according to a second preferred embodiment of the present invention.

As illustrated in FIG. 4, a power supply system according to the present preferred embodiment includes the two power supply modules 12A and 12B and a battery system 2101. In FIG. 4, substantially the same configurations as those in the first preferred embodiment are designated with the same reference numerals as those in FIG. 1. The battery system 2101 includes three battery modules 2013A, 2013B, and 2013C, and a module controller 2051 which controls power supply from the battery modules 2013A, 2013B, and 2013C to the load 31 or controls stop of the power supply. The battery modules 2013A, 2013B, and 2013C include the batteries 41A, 41B, and 41C, respectively, the bi-directional DC-DC converters 131A, 131B, and 131C, respectively, the converter controllers 132A, 132B, and 132C, respectively, which control operations of the bi-directional DC-DC converters 131A, 131B, and 131C, the current detectors 232, the voltage detectors 231 and 241, and temperature detectors 2251.

Each temperature detector 2251 includes a temperature sensor which uses, for example, a thermocouple or a thermistor, and a temperature-information output unit which outputs, to the module controller 2051, temperature information indicating the ambient temperature detected by the temperature sensor.

Figure 5:
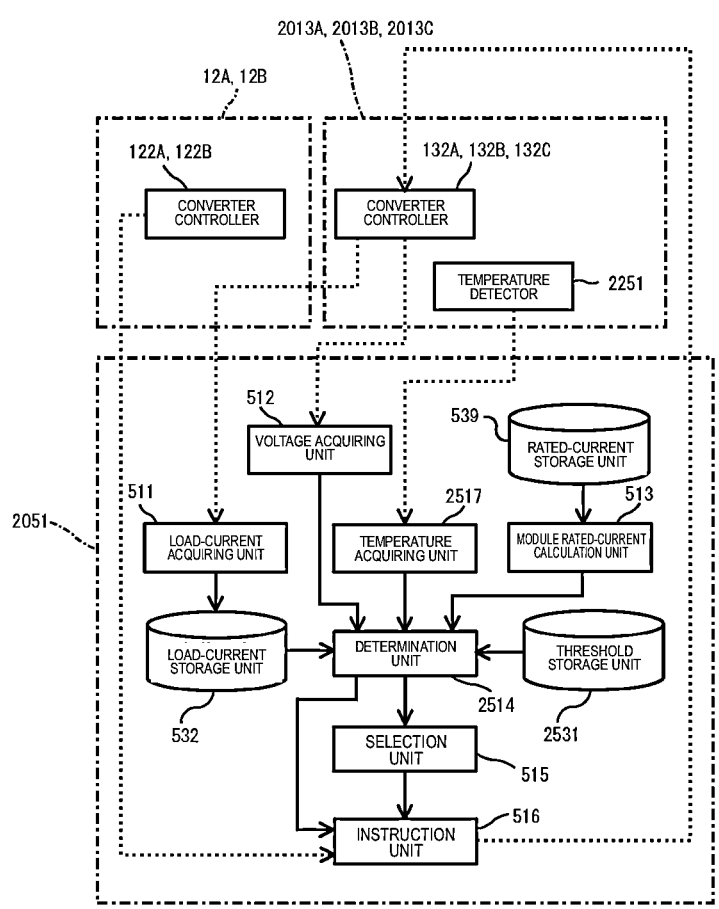
FIG. 5 is a functional block diagram illustrating a module controller according to the second preferred embodiment of the present invention.

The module controller 2051 selects a battery module, which has a battery having a battery voltage which is below the preset first voltage threshold, or a battery module (for example, the battery module 2013A), having a temperature exceeding the preset temperature threshold, among the battery modules 2013A, 2013B, and 2013C based on the battery-voltage information, which is received from the converter controllers 132A, 132B, and 132C, and based on the temperature information received from the temperature detectors 2251. The condition that the battery voltage of at least one of the batteries 41A, 41B, and 41C included in the battery modules 2013A, 2013B, and 2013C is below the preset first voltage threshold, or that the temperature of at least one of the battery modules 2013A, 2013B, and 2013C exceeds the preset temperature threshold corresponds to the first stop condition for the battery modules 2013A, 2013B, and 2013C. When the current value of a load current required to be supplied to the load 31 exceeds the total current value of the rated currents of all the other battery modules, that is, the battery module 2013C, excluding the selected battery module 2013A and the battery module 2013B having the corresponding one of the battery 41A, 42B, 43C whose battery voltage is below the preset second voltage threshold larger than the first voltage threshold, among the battery modules 2013A, 2013B, and 2013C, the module controller 2051 controls the converter controllers 132A, 132B, and 132C so that power supply from the battery modules 2013A, 2013B, and 2013C to the load 31 is stopped. The condition that the current value of a load current required to be supplied to the load 31 exceeds the total current value of the rated currents of all the other battery modules, excluding a battery module having battery voltage which is below the first threshold or having a temperature exceeding the temperature threshold and a battery module having a battery voltage which is below the second voltage threshold, among the battery modules 2013A, 2013B, and 2013C corresponds to the second stop condition for the battery modules 2013A, 2013B, and 2013C. In the module controller 2051, a processor runs programs stored in a memory. Thus, as illustrated in FIG. 5, the module controller 2051 is configured or programmed to function as the load-current acquiring unit 511, the voltage acquiring unit 512, a temperature acquiring unit 2517, the module rated-current calculation unit 513, a determination unit 2514, the selection unit 515, and the instruction unit 516. In FIG. 5, substantially the same configurations as those in the first preferred embodiment are designated with the same reference numerals as those in FIG. 2. The memory includes a threshold storage unit 2531 which stores information indicating the first voltage threshold, the second voltage threshold, and the temperature threshold, the load-current storage unit 532 which stores the load-current information, and the rated-current storage unit 539. The second voltage threshold is set to a voltage lower than the first voltage threshold. The first voltage threshold is set, for example, so as to indicate a voltage of about 60% with respect to the battery voltages of the batteries 41A, 41B, and 41C in full charge. The second voltage threshold is set, for example, so as to indicate a voltage of about 62% with respect to the battery voltages of the batteries 41A, 41B, and 41C in full charge. The temperature threshold is set based on the allowable temperature of the batteries 41A, 41B, and 41C, and is set, for example, to about 80° C.

The temperature acquiring unit 2517 acquires temperature information received from the temperature detectors 2251 of the battery modules 2013A, 2013B, and 2013C, and notifies the determination unit 2514 of the temperatures indicated by the acquired temperature information.

The determination unit 2514 determines whether a battery having a battery voltage which is below the first voltage threshold is present among the batteries 41A, 41B, and 41C included in the battery modules 2013A, 2013B, and 2013C, respectively, based on the voltage values of the battery voltages notified from the voltage acquiring unit 512. The determination unit 2514 monitors, for each of the battery modules 2013A, 2013B, and 2013C, whether the battery module is abnormal or normal, based on the temperatures of the batteries 41A, 41B, and 41C included in the battery modules 2013A, 2013B, and 2013C, respectively. In the monitoring, the determination unit 2514 determines whether a battery module having a temperature exceeding the temperature threshold is present among the battery modules 2013A, 2013B, and 2013C, based on the temperatures notified from the temperature acquiring units 2517. The determination unit 514 determines whether a battery module having the corresponding one of the batteries 41A, 41B, and 41C whose voltage value is below the second voltage threshold is present among the battery modules 2013A, 2013B, and 2013C which belong to a battery module group excluding those each having the corresponding one of the batteries 41A, 41B, and 41C whose battery voltage is below the first voltage threshold and those each having a temperature exceeding the temperature threshold, from the battery modules 2013A, 2013B, and 2013C. Further, the determination unit 2514 obtains the load-current information stored in the load-current storage unit 532, and determines whether the current value indicated by the load-current information exceeds the total current value of the rated currents of the battery modules 2013A, 2013B, and 2013C other than the following battery modules: those each having the corresponding one of the batteries 41A, 41B, and 41C of the battery modules 2013A, 2013B, and 2013C whose battery voltage is below the first voltage threshold; those each having a temperature exceeding the temperature threshold; those each having the corresponding one of the batteries 41A, 41B, and 41C whose voltage value is below the second voltage threshold.

When the determination unit 2514 determines that a battery module having the corresponding one of the batteries 41A, 41B, and 41C whose battery voltage is below the first voltage threshold or having a temperature exceeding the temperature threshold is present among the battery modules 2013A, 2013B, and 2013C, the selection unit 515 selects, as a first battery module, the corresponding battery module 2013A, 2013B, or 2013C. The determination unit 514 determines, to be a second battery module, a battery module having the corresponding one of the batteries 41A, 41B, and 41C whose battery voltage is below the second voltage threshold, among the battery modules 2013A, 2013B, and 2013C, other than the first battery module included in the battery modules 2013A, 2013B, and 2013C. When the current value of a current required to be supplied to the load 31 exceeds the total value of the rated current values of the battery modules, other than the first battery module and the second battery module, among the battery modules 2013A, 2013B, and 2013C, the selection unit 515 selects all the battery modules, other than the first battery module, among the battery modules 2013A, 2013B, and 2013C. For example, when the battery 41A of the battery module 2013A has a battery voltage which is below the first voltage threshold, the selection unit 515 selects the battery module 2013A as a first battery module. For example, when the temperature of the battery module 2013A exceeds the temperature threshold, the selection unit 515 also selects the battery module 2013A as a first battery module. When, among the batteries 41B and 41C of the remaining battery modules 2013B and 2013C which are supplying power to the load 31, the battery 41B has a battery voltage which is below the second voltage threshold, the selection unit 515 regards the battery module 2013B as a second battery module. When the current value of a current required to be supplied to the load 31 exceeds the rated current value of the battery module 2013C which is other than the first battery module 2013A and the second battery module 2013B among the battery modules 2013A, 2013B, and 2013C, the selection unit 515 selects all the battery modules 2013B and 2013C which are other than the first battery module 2013A, among the battery modules 2013A, 2013B, and 2013C.

Figure 6:
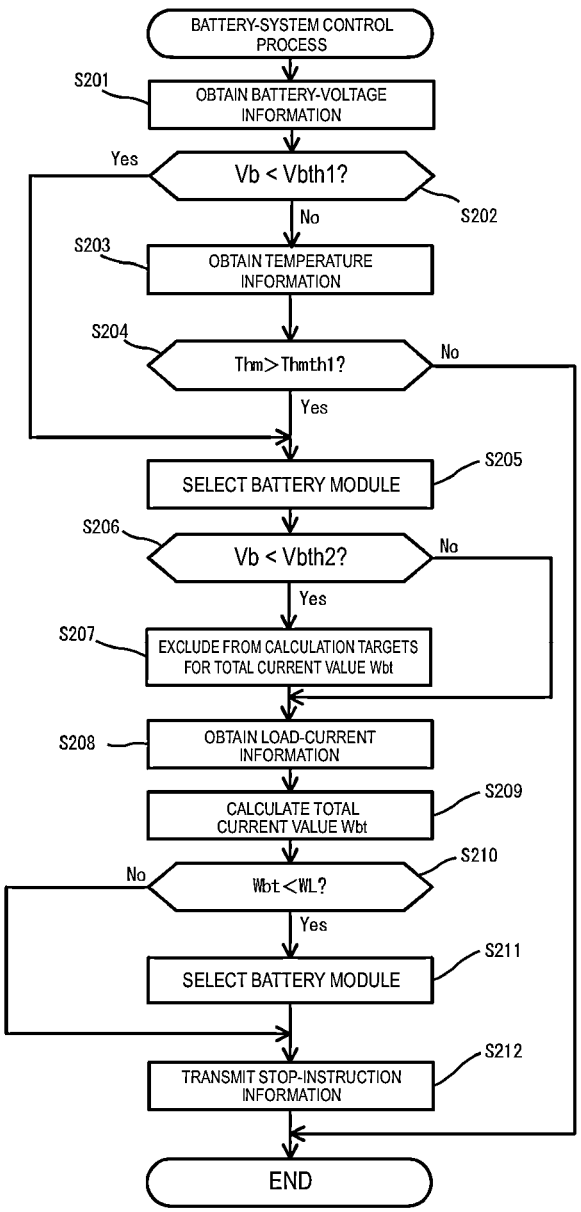
FIG. 6 is a flowchart of an exemplary battery-system control process performed by a module controller according to the second preferred embodiment of the present invention.

A battery-system control process performed by the module controller 2051 according to the present preferred embodiment will be described by referring to FIG. 6. Like the first preferred embodiment, the battery-system control process is repeatedly performed at a preset processing cycle. The voltage acquiring unit 512 acquires the battery-voltage information from each of the converter controllers 132A, 132B, and 132C of the battery modules 2013A, 2013B, and 2013C (step S201). At that time, the voltage acquiring unit 512 notifies the determination unit 2514 of the voltage values indicated by the acquired battery-voltage information.

The determination unit 2514 determines whether a battery having a battery voltage whose voltage value Vb is below the first voltage threshold Vbth1 is present (step S202). Assume that the determination unit 2514 determines that a battery having a battery voltage whose voltage value Vb is below the first voltage threshold Vbth1 is present among the batteries 41A, 41B, and 41C (step S202: Yes). In this case, the selection unit 515 selects a battery module (for example, the battery module 2013A) having a battery (for example, the battery 41A) which is determined by the determination unit 2514 to have a battery voltage which is below the first voltage threshold (step S205). In contrast, assume that the determination unit 2514 determines that all the voltage values Vb of the battery voltages of the batteries 41A, 41B, and 41C are greater than or equal to the first voltage threshold Vbth1 (step S202: No). In this case, the temperature acquiring unit 2517 acquires the temperature information from the temperature detectors 2251 of the battery modules 2013A, 2013B, and 2013C (step S203). At that time, the temperature acquiring unit 2517 notifies the determination unit 2514 of the temperatures indicated by the acquired temperature information. The determination unit 2514 determines whether a battery module having a temperature Thm which exceeds the temperature threshold Thmth1 is present among the battery modules 2013A, 2013B, and 2013C, based on the temperatures of the battery modules 2013A, 2013B, and 2013C which are notified from the temperature acquiring unit 2517 (step S204). If the determination unit 2514 determines that all the temperatures Thm of the battery modules 2013A, 2013B, and 2013C are less than or equal to the temperature threshold Thmth1 (step S204: No), the battery-system control process ends. In contrast, assume that the determination unit 2514 determines that a battery module having a temperature Thm which exceeds the temperature threshold Thmth1 is present among the battery modules 2013A, 2013B, and 2013C (step S204: Yes). In this case, the selection unit 515 selects the battery module (for example, the battery module 2013A) which is determined by the determination unit 2514 to have a temperature Thm which exceeds the temperature threshold Thmth1 (step S205). In this step, the determination unit 2514 determines whether a battery module satisfying the first stop condition is present among the battery modules 2013A, 2013B, and 2013C, and the selection unit 515 selects the battery module satisfying the first stop condition. At the time point of the end of step S205, the battery module 2013A is not stopped. In the series of processes from step S201 to step S205, battery modules (for example, the battery module 2013A) that are to be stopped are selected. Without execution of the process in step S202, only the processes in steps S203 and S204 may be performed.

Subsequently, the determination unit 2514 determines whether a battery module having the corresponding one of the batteries 41A, 41B, and 41C which has a battery voltage whose voltage value Vb is below the second voltage threshold Vbth2 is present among the battery modules 2013B and 2013C that are included in the battery modules 2013A, 2013B, and 2013C which are supplying power to the load 31, and that each have the corresponding one of the batteries 41A, 41B, and 41C which has a battery voltage whose voltage value Vb is greater than the first voltage threshold Vbth1 or each have a temperature Thm below the temperature threshold Thmth1 (step S206). If the determination unit 2514 determines that all the voltage values Vb of the battery voltages of the batteries 41B and 41C are greater than or equal to the second voltage threshold Vbth2 (step S206: No), the process in step S208 described below is performed. In contrast, assume that the determination unit 2514 determines that a battery having a battery voltage whose voltage value Vb is below the second voltage threshold Vbth2 is present among the batteries 41B and 41C (step S206: Yes). In this case, the selection unit 515 excludes, from the calculation targets for the total current value Wbt of the rated current values of the battery modules in step S209 described below, the battery module (for example, the battery module 2013B) having the battery (for example, the battery 41B) which is determined by the determination unit 2514 to have a battery voltage whose voltage value Vb is below the second voltage threshold Vbth2 (step S207).

After that, the determination unit 2514 obtains the load-current information stored in the load-current storage unit 532 (step S208). The module rated-current calculation unit 513 calculates the total current value Wbt of the rated currents of all the battery modules (in this case, the battery module 2013C), which are supplying power to the load 31 and which are other than the battery module 2013A selected by the selection unit 515 in step S205 and other than the battery module 2013B determined by the determination unit 2514 in step S207 (step S209). Then, the determination unit 2514 determines whether the current value WL indicated by the obtained load-current information exceeds the total current value Wbt of the rated currents which is calculated by the module rated-current calculation unit 513 (step S210). Assume that the determination unit 2514 determines that the current value WL indicated by the load-current information is less than or equal to the total current value Wbt of the rated currents of the battery modules 2013C (step S210: No). In this case, the instruction unit 516 collectively transmits the stop-instruction information to the battery module 2013A selected in step S205 (step S212), and the battery-system control process ends.

In contrast, assume that the determination unit 514 determines that the current value WL indicated by the load-current information exceeds the total current value Wbt of the rated currents of the battery modules 2013C (step S210: Yes). In this case, the selection unit 515 selects all the battery modules (in this case, the battery module 2013B and the battery module 2013C), which are supplying power to the load 31 and which are other than the battery module 2013A selected by the selection unit 515 in step S205 (step S211). The battery modules (in this case, the battery module 2013B and the battery module 2013C) selected in the series of processes from step S206 to step S211 are not stopped at this time point.

After that, the instruction unit 516 collectively transmits the stop-instruction information to all the battery modules selected in step S205 and step S211 described above (step S212), and the battery-system control process ends.

As described above, in the battery system 2101 according to the present preferred embodiment, among the battery modules 2013A, 2013B, and 2013C, the bi-directional DC-DC converter (for example, the bi-directional DC-DC converter 131A) of the battery module (for example, the battery module 2013A) having a temperature exceeding the temperature threshold is stopped. Thus, excessive increases of the temperatures of the battery modules 2013A, 2013B, and 2013C may be prevented, achieving reduction or prevention of breakdowns of the battery modules 2013A, 2013B, and 2013C due to the excessive temperature increases.

In the module controller 2051 according to the present preferred embodiment, when the current value of a current required to be supplied to the load 31 exceeds the total current value of the rated currents of all the other battery modules, that is, the battery module 2013C, that are included in the battery modules 2013A, 2013B, and 2013C and that are other than the battery module 2013A having a battery voltage which is below the first voltage threshold or having a temperature exceeding the temperature threshold and other than the battery module 2013B having a battery voltage which is below the second voltage threshold, power supply from the battery modules 2013A, 2013B, and 2013C to the load 31 is stopped. Thus, the battery module 2013B having the battery 41B whose battery voltage is highly likely to be below the first voltage threshold may be stopped in advance, achieving reduction or prevention of damage of the battery 41B due to excessive discharge of the battery 41B.

Third Preferred Embodiment

A battery system according to the present preferred embodiment is different from that of the first preferred embodiment in that each of the battery modules includes a current detector which detects discharge currents from its battery or charge currents to its battery. The module controller according to the present preferred embodiment calculates SOC values indicating the states of charge of the batteries, based on the histories of the current values of discharge currents or charge currents detected by the current detectors. When a first battery module having a battery, which has a battery voltage which is below the preset first voltage threshold or has an SOC value which is below a preset SOC threshold, is present among the batteries of the battery modules, the module controller selects the first battery module. The module controller selects a second battery module, which has a battery voltage which is below the preset second voltage threshold higher than the first voltage threshold, from a battery module group which is a group of all the battery modules, which are supplying power to a load and which are other than the first battery module, among the battery modules. When the current value of a current required to be supplied to the load is less than or equal to the total current value of the rated current of at least one battery module, other than the first battery module and the second battery module, among the battery modules, the module controller controls the other battery modules so that the battery modules, other than the first battery module, among the battery modules supply power to the load.

Figure 7:
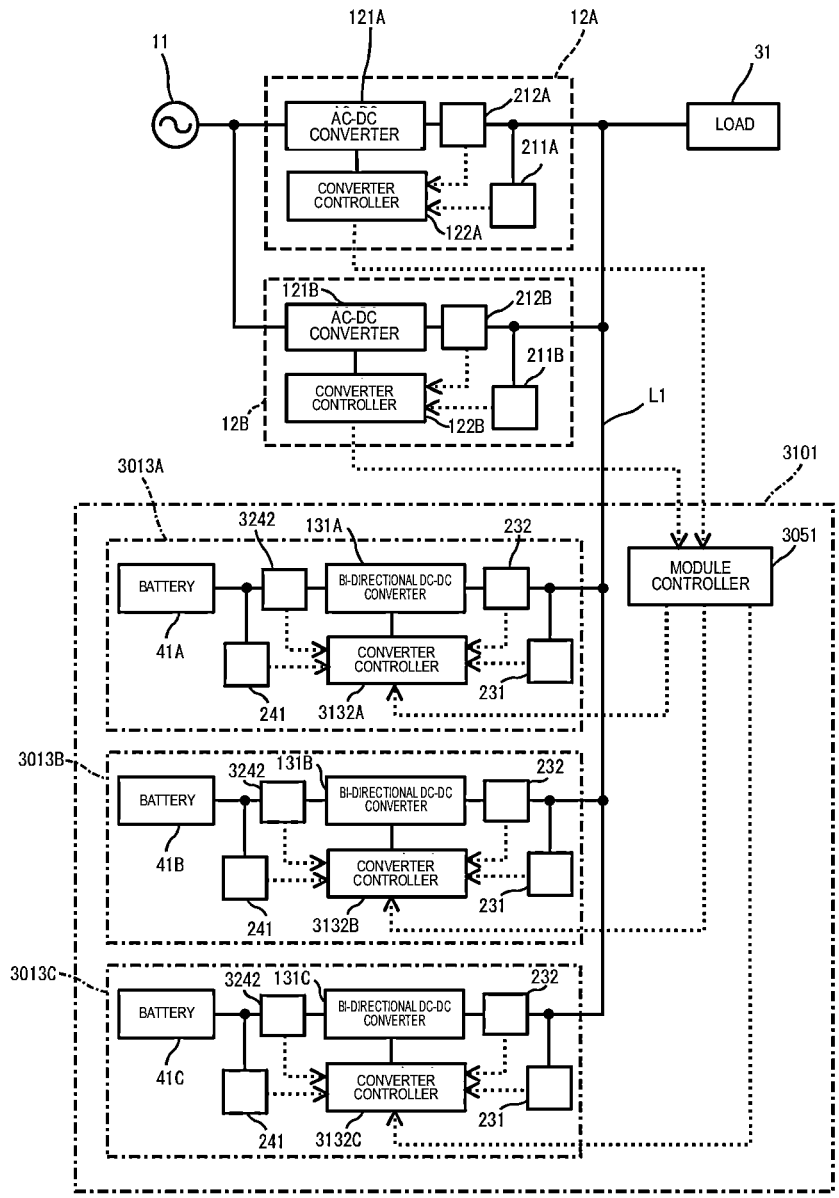
FIG. 7 is a block diagram illustrating a power supply system according to a third preferred embodiment of the present invention.

As illustrated in FIG. 7, a power supply system according to the present preferred embodiment includes the two power supply modules 12A and 12B and a battery system 3101. In FIG. 7, substantially the same configurations as those in the first preferred embodiment are designated with the same reference numerals as those in FIG. 1. The battery system 3101 includes three battery modules 3013A, 3013B, and 3013C, and a module controller 3051 configured or programmed to control power supply from the battery modules 3013A, 3013B, and 3013C to the load 31 and controls stop of the power supply. The battery modules 3013A, 3013B, and 3013C include the batteries 41A, 41B, and 41C, respectively, the bi-directional DC-DC converters 131A, 131B, and 131C, respectively, converter controllers 3132A, 3132B, and 3132C, respectively, which control operations of the bi-directional DC-DC converters 131A, 131B, and 131C, current detectors 232 and 3242, and the voltage detectors 231 and 241.

Each current detector 3242 detects a voltage which occurs across both the ends of a resistor (not illustrated) connected in series between the corresponding one of the batteries 41A, 41B, and 41C and the corresponding one of the bi-directional DCDC converters 131A, 131B, and 131C. Thus, each current detector 3242 detects the current value of a discharge current from the corresponding one of the batteries 41A, 41B, and 41C or a charge current which is output to the corresponding one of the batteries 41A, 41B, and 41C from the corresponding one of the bi-directional DC-DC converters 131A, 131B, and 131C. Then, each current detector 3242 outputs, to the corresponding one of the converter controllers 3132A, 3132B, and 3132C, a detected current signal indicating the detected current.

The converter controllers 3132A, 3132B, and 3132C each generate charge/discharge-current information indicating the current value of a discharge current or a charge current from/to the corresponding one of the batteries 41A, 41B, and 41C from a detected current signal received from the corresponding current detector 3242, and output the generated charge/discharge-current information to the module controller 3051. Along with the charge/discharge-current information, the converter controllers 3132A, 3132B, and 3132C each output, to the module controller 3051, operation-mode information indicating the operation mode of the corresponding one of the bi-directional DC-DC converters 131A, 131B, and 131C. In addition, the converter controllers 3132A, 3132B, and 3132C each generate battery-voltage information indicating the battery voltage of the corresponding one of the batteries 41A, 41B, and 41C from a detected-voltage signal received from the corresponding voltage detector 241, and output the generated battery-voltage information to the module controller 3051.

Figure 8:
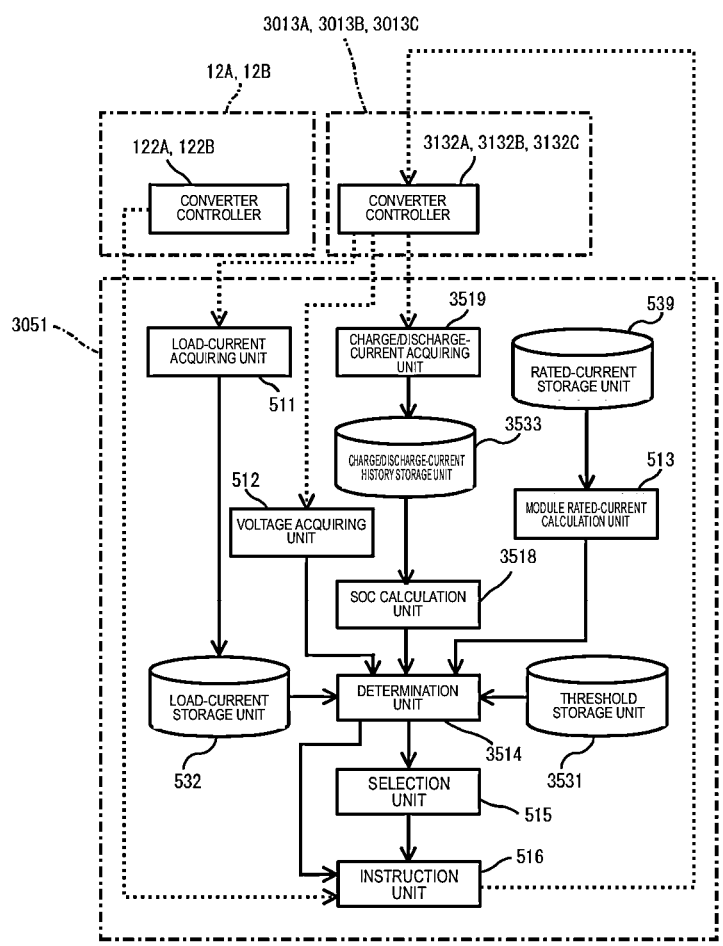
FIG. 8 is a functional block diagram illustrating a module controller according to the third preferred embodiment of the present invention.

The module controller 3051 calculates an SOC value indicating the state of charge of each of the batteries 41A, 41B, and 41C, based on the charge/discharge-current information received from the converter controllers 3132A, 3132B, and 3132C. Based on the battery-voltage information received from the converter controllers 3132A, 3132B, and 3132C and the calculated SOC values, when a battery module (for example, the battery module 3013A) having a battery (for example, the battery 41A) which has a battery voltage which is below the preset first voltage threshold or has an SOC value which is below the preset SOC threshold is present among the batteries 41A, 41B, and 41C of the battery modules 3013A, 3013B, and 3013C, the module controller 3051 selects the battery module 3013A. The condition that the battery voltage of at least one of the batteries 41A, 41B, and 41C included in the battery modules 3013A, 3013B, and 3013C is below the preset first voltage threshold, or that the SOC value of at least one of the batteries 41A, 41B, and 41C is below the SOC threshold corresponds to the first stop condition for the battery modules 3013A, 3013B, and 3013C. When the current value of a load current required to be supplied to the load 31 exceeds the total current value of the rated currents of all the battery modules 3013B and 3013C, other than the selected battery module 3013A, among the battery modules 3013A, 3013B, and 3013C, the module controller 3051 controls the converter controllers 132A, 132B, and 132C so that power supply from the battery modules 3013A, 3013B, and 3013C to the load 31 is stopped. In the module controller 3051, a processor runs programs stored in a memory. Thus, as illustrated in FIG. 8, the module controller 3051 is configured or programmed to function as the load-current acquiring unit 511, the voltage acquiring unit 512, a charge/discharge-current acquiring unit 3519, an SOC calculation unit 3518, the module rated-current calculation unit 513, a determination unit 3514, the selection unit 515, and the instruction unit 516. In FIG. 8, substantially the same configurations as those in the first preferred embodiment are designated with the same reference numerals as those in FIG. 2. The memory includes a threshold storage unit 3531 which stores information indicating the preset first voltage threshold, the preset second voltage threshold, and the preset SOC threshold, the load-current storage unit 532, a charge/discharge-current history storage unit 3533 which stores histories of current values of charge currents or discharge currents of the batteries 41A, 41B, and 41C, and the rated-current storage unit 539. The charge/discharge-current history storage unit 3533 stores information indicating current values of charge currents or discharge currents of the batteries 41A, 41B, and 41C, in association with the batteries 41A, 41B, and 41C on a time-series basis. For example, the charge/discharge-current history storage unit 3533 stores, as a positive current value, a current value indicating a charge current, and, as a negative current value, a current value indicating a discharge current. The second voltage threshold is set to a voltage greater than the first voltage threshold. The SOC threshold is set based on the electric storage performance of the batteries 41A, 41B, and 41C, and is set, for example, to about 1%.

The charge/discharge-current acquiring unit 3519 acquires charge/discharge-current information, which is received from the converter controllers 3132A, 3132B, and 3132C, at every preset processing cycle, and stores the acquired charge/discharge-current information in the charge/discharge-current history storage unit 3533 on a time-series basis. When the operation-mode information received from the converter controllers 3132A, 3132B, and 3132C indicates the discharge mode, the charge/discharge-current acquiring unit 3519 converts, to a negative value, the current value indicated by the charge/discharge-current information, and stores the converted value in the charge/discharge-current history storage unit 3533. In contrast, when the operation-mode information received from the converter controllers 3132A, 3132B, and 3132C indicates the charge mode, the charge/discharge-current acquiring unit 3519 stores the current value indicated by the charge/discharge-current information, as it is, in the charge/discharge-current history storage unit 3533.

The SOC calculation unit 3518 calculates an SOC value indicating the state of charge of each of the batteries 41A, 41B, and 41C, based on the charge/discharge-current information stored in the charge/discharge-current history storage unit 3533, and notifies the determination unit 3514 of the calculated SOC value. Specifically, the SOC calculation unit 3518 integrates the current values indicated by the charge/discharge-current information to calculate the current-integrated value. The SOC calculation unit 3518 divides the calculated current-integrated value by the amount of electricity of the corresponding one of the batteries 41A,41B, and 41C which are in full charge, and thus calculates the SOC value.

The determination unit 3514 determines whether a battery having a battery voltage which is below the first voltage threshold is present among the batteries 41A, 41B, and 41C included in the battery modules 3013A, 3013B, and 3013C, based on the voltage values of the battery voltages notified from the voltage acquiring unit 512. When all the voltage values of the battery voltages of the batteries 41A, 41B, and 41C are greater than or equal to the first voltage threshold, the determination unit 3514 determines whether a battery having an SOC value which is below the SOC threshold is present among the batteries 41A, 41B, and 41C, based on the SOC values notified from the SOC calculation unit 3518. The determination unit 3514 monitors, for each of the battery modules 3013A, 3013B, and 3013C, whether the battery module is abnormal or normal, based on the SOC values of the batteries 41A, 41B, and 41C included in the battery modules 3013A, 3013B, and 3013C. In this monitoring, the determination unit 3514 determines whether a battery module having the corresponding one of the batteries 41A, 41B, and 41C having a battery voltage which is below the second voltage threshold is present among the battery modules 3013A, 3013B, and 3013C belonging to the battery module group which is included in the battery modules 3013A, 3013B, and 3013C which are supplying power to the load 31 and from which a battery module having the corresponding one of the batteries 41A, 41B, and 41C having a battery voltage which is below the first voltage threshold and a battery module having an SOC value which is below the SOC threshold are excluded. Further, the determination unit 3514 obtains the load-current information stored in the load-current storage unit 532, and determines whether the current value indicated by the load-current information exceeds the total current value of the rated currents of the battery modules 3013A, 3013B, and 3013C, other than a battery module having the corresponding one of the batteries 41A, 41B, and 41C having a battery voltage which is below the first voltage threshold and other than a battery module having an SOC value which is below the SOC threshold among the battery modules 3013A, 3013B, and 3013C.

When the determination unit 3514 determines that a battery having a battery voltage which is below the first voltage threshold, or a battery having an SOC value which is below the SOC threshold is present among the batteries 41A, 41B, and 41C, the selection unit 515 selects, as a first battery module, a battery module 3013A, 3013B, or 3013C having such a battery 41A, 41B, or 41C. When the determination unit 3514 determines that a battery module having the corresponding one of batteries 41A, 41B, and 41C whose battery voltage is below the second voltage threshold is present among the battery modules 3013A, 3013B, and 3013C other than the first battery module included in the battery modules 3013A, 3013B, and 3013C, the selection unit 515 selects, as a second battery module, such a battery module 3013A, 3013B, or 3013C. For example, when the battery 41A of the battery module 3013A has a battery voltage which is below the first voltage threshold, the selection unit 515 selects the battery module 3013A as a first battery module. Alternatively, when the battery module 3013A has an SOC value below the SOC threshold, the selection unit 515 also selects the battery module 3013A as a first battery module. Among the batteries 41B and 41C of the remaining battery modules 3013B and 3013C which are supplying power to the load 31, when the battery 41B has a battery voltage which is below the second voltage threshold, the selection unit 515 selects the battery module 3013B as a second battery module.

Figure 9:
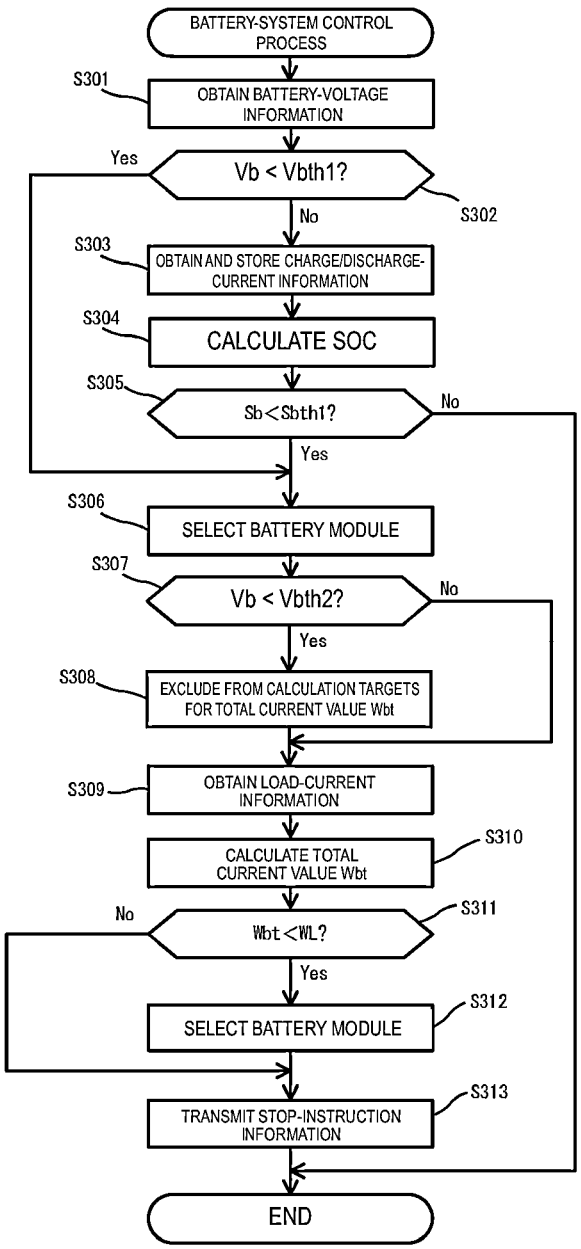
FIG. 9 is a flowchart of an exemplary battery-system control process performed by a module controller according to the third preferred embodiment of the present invention.

A battery-system control process performed by the module controller 3051 according to the present preferred embodiment will be described by referring to FIG. 9. Like the first preferred embodiment, the battery-system control process is repeatedly performed at a preset processing cycle. The voltage acquiring unit 512 acquires battery-voltage information from each of the converter controllers 3132A, 3132B, and 3132C of the battery modules 3013A and 3013B, 3013 (step S301). At that time, the voltage acquiring unit 512 notifies the determination unit 3514 of the voltage values indicated by the acquired battery-voltage information.

The determination unit 3514 determines whether a battery having a battery voltage whose voltage value Vb is below the first voltage threshold Vbth1 is present (step S302). Assume that the determination unit 3514 determines that a battery having a battery voltage whose voltage value Vb is below the first voltage threshold Vbth1 is present among the batteries 41A, 41B, and 41C (step S302: Yes). In this case, the selection unit 515 selects a battery module (for example, the battery module 3013A) having a battery (for example, the battery 41A) which is determined by the determination unit 3514 to have a battery voltage which is below the first voltage threshold (step S306). In contrast, assume that the determination unit 3514 determines that all of the voltage values Vb of the battery voltages of the batteries 41A, 41B, and 41C are greater than or equal to the first voltage threshold Vbth1 (step S302: No). In this case, the charge/discharge-current acquiring unit 3519 acquires charge/discharge-current information from the converter controllers 3132A, 3132B, and 3132C, and stores the acquired charge/discharge-current information in the charge/discharge-current history storage unit 3533 (step S303). Then, the SOC calculation unit 3518 calculates the SOC values of the batteries 41A, 41B, and 41C based on the charge/discharge-current information stored in the charge/discharge-current history storage unit 3533 (step S304). The SOC calculation unit 3518 notifies the determination unit 3514 of the calculated SOC values.

The determination unit 3514 determines whether a battery having an SOC value Sb which is below the SOC threshold Sbth1 is present among the batteries 41A, 41B, and 41C, based on the SOC values of the batteries 41A, 41B, and 41C which are notified from the SOC calculation unit 3518 (step S305). If the determination unit 3514 determines that all the SOC values Sb of the batteries 41A, 41B, and 41C are greater than or equal to the SOC threshold Sbth1 (step S305: No), the battery-system control process ends. In contrast, assume that the determination unit 3514 determines that a battery having an SOC value Sb which is below the SOC threshold Sbth1 is present among the batteries 41A, 41B, and 41C (step S305: Yes). In this case, the selection unit 515 selects the battery module (for example, the battery module 3013A) having the battery (for example, the battery 41A) which is determined by the determination unit 3514 to have an SOC value Sb which is below the SOC threshold Sbth1 (step S306). In the series of processes from step S301 to step S306, the determination unit 3514 determines whether a battery module satisfying the first stop condition is present among the battery modules 3013A, 3013B, and 3013C, and the selection unit 515 selects the battery module satisfying the first stop condition. At the time point of the end of step S306, the battery module 3013A is not stopped. Thus, in the series of processes from step S301 to step S306, battery modules (for example, the battery module 3013A) that are to be stopped are selected. In the series of processes from step S301 to step S306, without execution of the process in step S302 described above, only the processes from steps S303 to S305 may be performed.

After that, the determination unit 3514 determines whether at least one of the batteries 41A, 41B, and 41C which has a battery voltage whose voltage value Vb is below the second voltage threshold Vbth2 is present among the batteries 41B and 41C, which are among the batteries 41A, 41B, and 41C included in the battery modules 3013A, 3013B, and 3013C that are supplying power to the load 31 and each of which has a battery voltage whose voltage value Vb is greater than or equal to the first voltage threshold Vbth1 and has an SOC value that is greater than or equal to the SOC threshold Sbth1, based on the SOC values of the batteries 41A, 41B, and 41C notified from the SOC calculation unit 3518 (step S307). If the determination unit 3514 determines that all the voltage values Vb of the battery voltages of the batteries 41B and 41C are greater than or equal to the second voltage threshold Vbth2 (step S307: No), the process in step S309 described below is performed. In contrast, assume that the determination unit 3514 determines that, among the batteries 41B and 41C, a battery having a battery voltage whose voltage value Vb is below the second voltage threshold Vbth2 (step S307: Yes). In this case, the selection unit 515 excludes, from the calculation targets of the total current value Wbt of the rated current values of battery modules in step S310 described below, the battery module (for example, the battery module 3013B) having the battery (for example, the battery 41B) which is determined by the determination unit 3514 to have a battery voltage whose voltage value Vb is below the second voltage threshold Vbth2 (step S308).

After that, the determination unit 3514 obtains the load-current information stored in the load-current storage unit 532 (step S309). The module rated-current calculation unit 513 calculates the total current value Wbt of the rated currents of all the battery modules (in this case, the battery modules 3013B and 3013C), which are supplying power to the load 31 and which are other than the battery module 3013A and 3013B selected by the selection unit 515 in step S306 (step S310) and step S308. The determination unit 3514 determines whether the current value WL indicated by the acquired load-current information exceeds the total current value Wbt of the rated currents which is calculated by the module rated-current calculation unit 513 (step S311). Assume that the determination unit 3514 determines that the current value WL indicated by the load-current information is less than or equal to the total current value Wbt of the rated currents of the battery modules 3013B and 3013C (step S311: No). In this case, the instruction unit 516 collectively transmits the stop-instruction information to the battery modules 3013A which are selected in step S306 described above (step S313), and the battery-system control process ends.

In contrast, assume that the determination unit 514 determines that the current value WL indicated by the load-current information exceeds the total current value Wbt of the rated currents of the battery modules 3013B and 3013C (step S311: Yes). In this case, the selection unit 515 selects all the battery modules (in this case, the battery module 3013B and the battery module 3013C), which are supplying power to the load 31 and which are other than the battery module 3013A selected by the selection unit 515 in step S306 (step S312). The battery modules (in this case, the battery module 3013B and the battery module 3013C) selected in the series of processes from step S307 to step S312 are not stopped at this time point.

After that, the instruction unit 516 collectively transmits the stop-instruction information to all the battery modules selected in step S306 and step S312 described above (step S313), and the battery-system control process ends.

As described above, in the battery system 3101 according to the present preferred embodiment, among the batteries 41A, 41B, and 41C, the bi-directional DC-DC converter (for example, the bi-directional DC-DC converter 131A) of the battery module (for example, the battery module 3013A) having a battery (for example, the battery 41A) having an SOC value which is below the SOC threshold is stopped. Thus, excessive discharge of the batteries 41A, 41B, and 41 is prevented, achieving reduction or prevention of damage of the batteries 41A, 41B, and 41C due to the excessive discharge. In addition, assume that the current value of a current required to be supplied to the load 31 exceeds the total current value of the rated currents of all the other battery modules, that is, the battery module 3013C, which is obtained by excluding, from the battery modules 3013A, 3013B, and 3013C, the battery module 3013A, which has the corresponding one of the batteries 41A, 41B, and 41C having a battery voltage which is below the first voltage threshold or has an SOC value which is below the SOC threshold, and the battery module 2013B, whose battery voltage is below the second voltage threshold. In this case, the module controller 3051 stops the power supply from the battery modules 3013A, 3013B, and 3013C to the load 31. Thus, the battery module 3013B, having the battery 41B whose battery voltage is highly likely to be below the first voltage threshold, may be stopped in advance, achieving reduction or prevention of damage of the battery 41B due to excessive discharge of the battery 41B.

Figure 10:
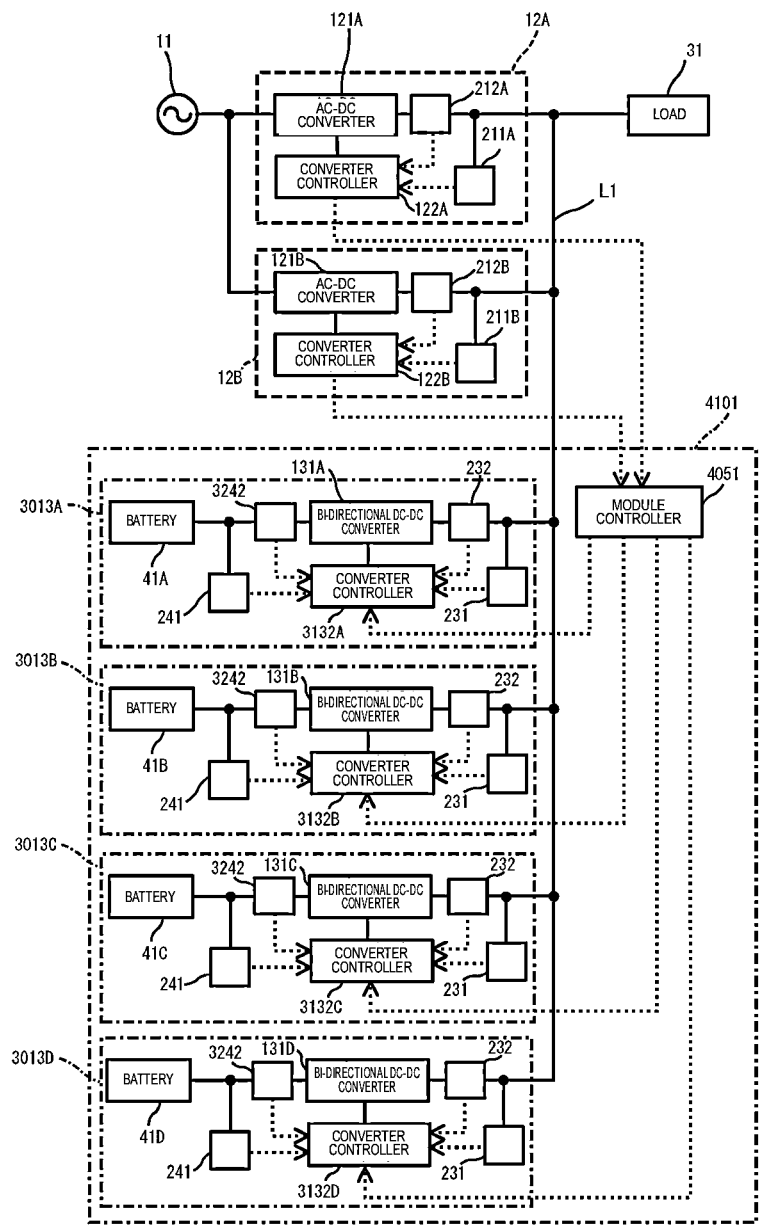
FIG. 10 is a block diagram illustrating a power supply system according to a modified example of a preferred embodiment of the present invention.

The preferred embodiments of the present invention are described above. The present invention is not limited to the configurations according to the preferred embodiments described above. For example, as in a battery system 4101 illustrated in FIG. 10, four battery modules 3013A, 3013B, 3013C, and 3013D may be included. In FIG. 10, substantially the same configurations as those in the third preferred embodiment are designated with the same reference numerals as those in FIG. 7. The battery module 3013D includes a battery 41D, a bi-directional DC-DC converter 131D, a converter controller 3132D which controls operations of the bi-directional DC-DC converter 131D, the current detectors 232 and 3242, and the voltage detectors 231 and 241. The battery 41D has substantially the same as the batteries 41A, 41B, and 41C. The converter controller 3132D has substantially the same functions as those of the converter controllers 3132A, 3132B, and 3132C.

A module controller 4051 has substantially the same function as that of the module controller 3051 described in the third preferred embodiment, and performs the battery-system control process described in the third preferred embodiment. Assume that, for example, the SOC values of the four batteries 41A, 41B, and 41C, 41D are about 1%, about 2%, about 2%, and about 50%, respectively. Assume that the SOC threshold is about 1.5% and that the battery voltages of the batteries 41B and 41C are below the second voltage threshold. In this case, the module controller 4051 outputs stop-instruction information to the battery modules 3013B and 3013C, having the batteries 41B and 41C, as well as the battery module 3013A having the battery 41A, so as to stop the battery modules 3013A, 3013B, and 3013C. Assume that the SOC values of the four batteries 41A, 41B, and 41C, 41D are about 1%, about 2%, about 50%, and about 50%, respectively. Assume that the SOC threshold is about 3%, and that the battery voltage of the battery 41C is below the second voltage threshold. In this case, the module controller 4051 outputs stop-instruction information to the battery module 3013C, having the battery 41C, as well as the battery modules 3013A and 3013B having the batteries 41A and 41B, so as to stop the battery modules 3013A, 3013B, and 3013C.

Figure 11:
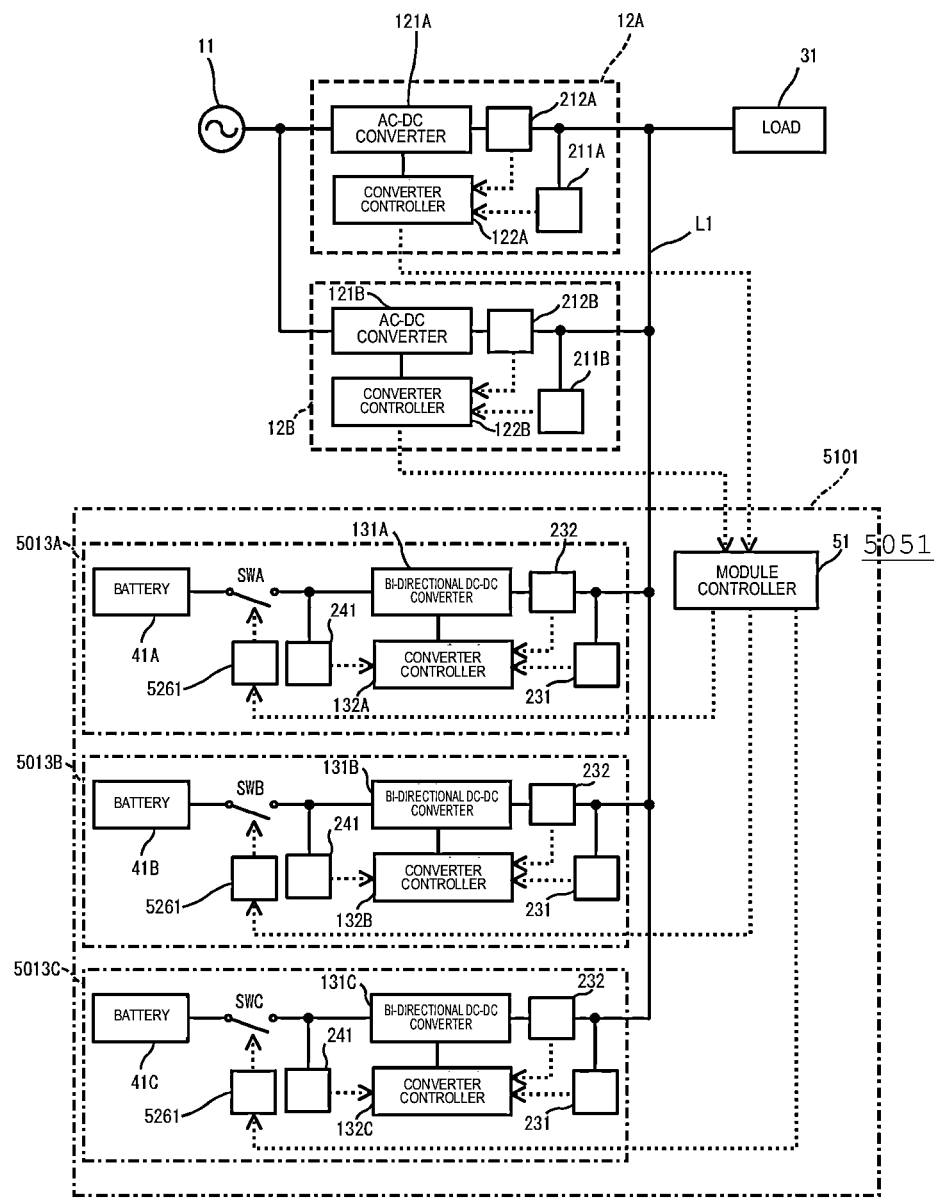
FIG. 11 is a block diagram illustrating a power supply system according to a modified example of a preferred embodiment of the present invention.

In the preferred embodiments, the example in which the module controllers 51, 2051, and 3051 output the stop-instruction information to the converter controllers 132A, 132B, 132C, 2132A, 2132B, 2132C, 3132A, 3132B, and 3132C in accordance with the various stop conditions, so as to stop the bi-directional DC-DC converters 131A, 131B, and 131C is described. However, the configuration is not limited to this. For example, as in a battery system 5101 in FIG. 11, a module controller 5051 may open/close switches SWA, SWB, and SWC disposed in battery modules 5013A, 5013B, and 5013C, in accordance with the various stop conditions. The switches SWA, SWB, and SWC are, for example, semiconductor relays or mechanical relays, and are interposed between the batteries 41A, 41B, and 41C and the bi-directional DC-DC converters 131A, 131B, and 131C. The battery modules 5013A, 5013B, and 5013C include switch driving units 5261 which drive the switches SWA, SWB, and SWC in accordance with instruction information received from the module controller 5051. Upon reception of the stop-instruction information from the module controller 5051, a switch driving unit 5261 opens the corresponding one of the switches SWA, SWB, and SWC.

The configuration enables rapid shutdown of the power supply from the batteries 41A, 41B, and 41C to the load 31. Accordingly, stress applied to the battery modules 5013A, 5013B, and 5013C may be reduced.

Figure 12:
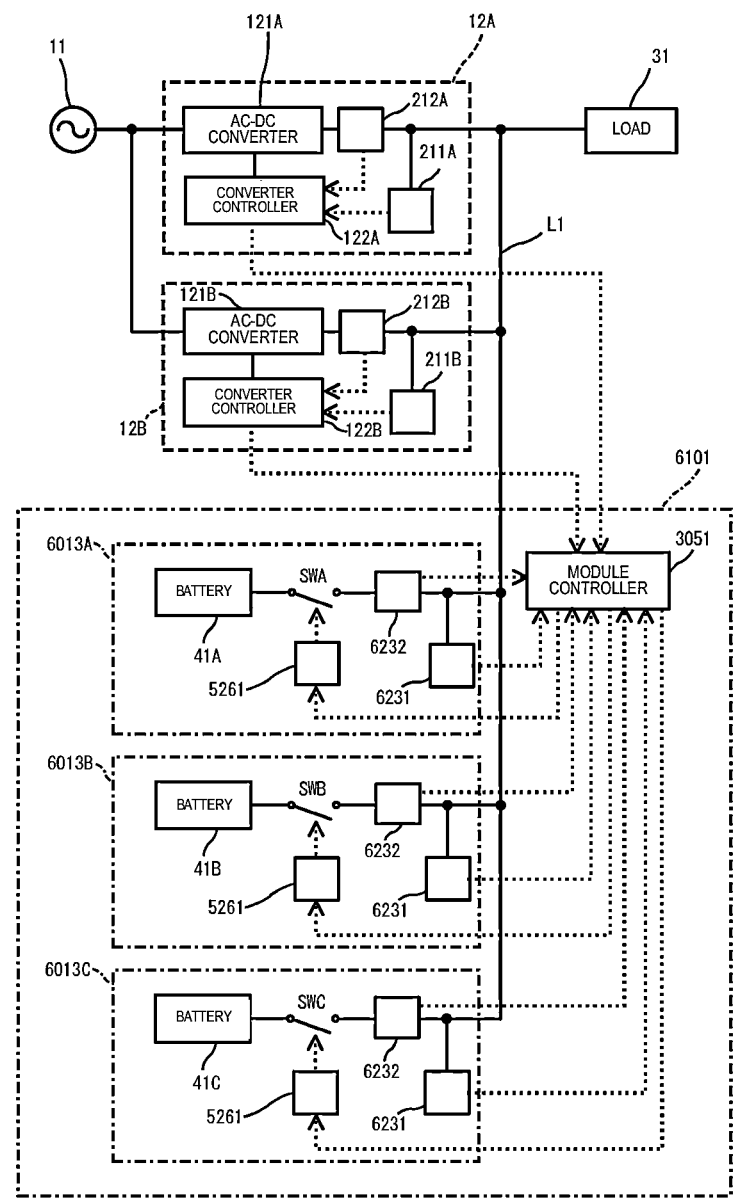
FIG. 12 is a block diagram illustrating a power supply system according to a modified example of a preferred embodiment of the present invention.

In the preferred embodiments, the example in which the battery modules 13A, 13B, 13C, 2013A, 2013B, 2013C, 3013A, 3013B, and 3013C each have the corresponding one of the bi-directional DC-DC converters 131A, 131B, and 131C is described. However, the configuration is not limited to this. For example, as in a battery system 6101 illustrated in FIG. 12, battery modules 6013A, 6013B, and 6013C which do not have bi-directional DC-DC converters may be included. In FIG. 12, substantially the same configurations as those in the first and third preferred embodiments are designated with the same reference numerals as those in FIGS. 1 and 7. The battery modules 6013A, 6013B, and 6013C include the batteries 41A, 41B, and 41C, respectively, the switches SWA, SWB, and SWC, respectively, voltage detectors 6231, current detectors 6232, and the switch driving units 5261.

For example, each current detector 6232 detects a voltage, which occurs across both the ends of a resistor (not illustrated) connected in series between the corresponding one of the switches SWA, SWB, and SWC and the load 31, so as to detect the output current of the corresponding one of the batteries 41A, 41B, and 41C. Each current detector 6232 generates output-current information indicating the current value of the detected output current, and outputs the generated output-current information to the module controller 3051. For example, each voltage detector 6231 detects a voltage which is obtained by dividing, in a certain division ratio, the voltage which occurs at the output end of the corresponding one of the battery modules 6013A, 6013B, and 6013C. Each voltage detector 6231 generates battery-voltage information indicating the detected voltage, and outputs the generated battery-voltage information to the module controller 51.

The module controller 3051 determines whether a battery having a battery voltage which is below the first voltage threshold is present among the battery modules 6013A, 6013B, and 6013C, based on the battery-voltage information received from the voltage detectors 6231. If the module controller 3051 determines that a battery having a battery voltage which is below the first voltage threshold is not present, the module controller 3051 calculates an SOC value indicating the state of charge of each of the batteries 41A, 41B, and 41C, based on the output-current information received from the current detectors 6232. The module controller 3051 selects a battery module (for example, the battery module 6013A) having a battery (for example, battery 41A) having an SOC value which is below the SOC threshold. When the module controller 3051 determines that the current value of a load current required to be supplied to the load 31 exceeds the total current value of the rated currents of all the battery modules 6013B and 6013C which are obtained by excluding the battery module 6013A from the battery modules 6013A, 6013B, and 6013C, the module controller 3051 controls the switch driving units 5261 so that power supply from the battery modules 6013A, 6013B, and 6013C to the load 31 is stopped.

The present configuration enables rapid shutdown of the power supply from the batteries 41A, 41B, and 41C to the load 31. Accordingly, stress applied to the battery modules 6013A, 6013B, and 6013C may be reduced.

In the first preferred embodiment, the module controller 51 may include an SOC determination unit which determines SOC values from the battery voltages of the batteries 41A, 41B, and 41C, and a correlation storage unit which stores correlation information indicating the correlation between the battery voltages of the batteries 41A, 41B, and 41C and the SOC values. The SOC determination unit refers to the correlation information stored in the correlation storage unit, and determines the SOC values corresponding to the battery voltages of the batteries 41A, 41B, and 41C. In this case, the determination unit may determine whether a battery having an SOC value which is below the SOC threshold described in the third preferred embodiment is present among the batteries 41A, 41B, and 41C, based on the SOC values of the batteries 41A, 41B, and 41C which are determined by the SOC determination unit. The selection unit may select a battery module having the corresponding one of the batteries 41A, 41B, and 41C whose SOC value is below the SOC threshold.

In the second preferred embodiment, the example in which the determination unit 2514 determines whether a battery having a battery voltage whose voltage value Vb is below the first voltage threshold Vbth1 is present is described. However, the configuration is not limited to this. For example, the determination unit 2514 may be a unit which does not compare the voltage value Vb of a battery voltage with the first voltage threshold Vbth1. Specifically, in the battery-system control process described by using FIG. 6 in the second preferred embodiment, the processes in steps S201, S202, S206, and S207 may be skipped. The process may start from the process in step S203. After the process in step S205 is performed, processes in step S208 and its subsequent steps may be performed. In this case, the selection unit 515 may select only a battery module having a battery whose temperature Thm is determined by the determination unit 2514 to exceed the temperature threshold Thmth1 in step S205.

Also in the third preferred embodiment, for example, the determination unit 3514 may be a unit which does not compare the voltage value Vb of a battery voltage with the first voltage threshold Vbth1. Specifically, in the battery-system control process described by using FIG. 9 in the third preferred embodiment, the processes in steps S301, S302, S307, and S308 may be skipped. The process may start from the process in step S303. After the process in step S306 is performed, the processes in step S309 and its subsequent steps may be performed. In this case, the selection unit 515 may select only a battery module having a battery whose SOC value Sb is determined by the determination unit 3514 to be below the SOC threshold Sbth1.

The present invention includes various preferred embodiments and modifications which are made without departing from the broad spirit and scope of the present invention. The preferred embodiments are described above to explain the present invention, not to limit the scope of the present invention. That is, the scope of the present invention is defined by the claims, not by the preferred embodiments. Various modifications, which are made within the scope of the claims and the scope of the present invention, may be regarded as within the scope of the present invention.

Preferred embodiments of the present invention are suitable for use in or as a battery system which is used along with a power supply module for servers.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A battery-system control method for a battery system including a module controller to control a plurality of battery modules capable of supplying power to a load to execute or stop supplying power, the method comprising:
    monitoring for each of the plurality of battery modules, whether the battery module is abnormal or normal, based on at least one of a voltage value of a battery included in the battery module, an SOC value of the battery indicating a state of charge, or a temperature of the battery;
    in response to detection of an abnormality, selecting a battery module having the abnormality, without stopping the abnormal battery module;
    after the selecting, comparing a current value of a current supplied to the load, with a total value of rated currents of all battery modules that are normal and that are supplying power to the load;
    when the current value of the current supplied to the load is greater than the total value of the rated currents of all the battery modules that are supplying power to the load, performing control to stop all the plurality of battery modules; and
    when the current value of the current supplied to the load is less than or equal to the total value of the rated currents of all the battery modules that are supplying power to the load, performing control to stop the abnormal battery module and not to stop the normal battery modules.

2. The battery-system control method according to claim 1, wherein, when it is determined that a battery module including a battery with a voltage value below a preset first voltage threshold is present among the plurality of battery modules, the module controller determines the battery module including the battery with the voltage value below the first voltage threshold to be abnormal.

3. The battery-system control method according to claim 2, wherein, when it is determined that a battery module including a battery with a voltage value below a preset second voltage threshold larger than the first voltage threshold is present among the plurality of battery modules, if the current value of the current supplied to the load is less than or equal to the total value of the rated currents of all the battery modules other than the battery module including the battery with the voltage value below the first voltage threshold, the module controller performs control to stop the abnormal battery module and not to stop the normal battery modules.

4. The battery-system control method according to claim 1, wherein, based on temperatures of batteries included in the plurality of battery modules, when at least one battery module among the plurality of battery modules includes a battery with a temperature exceeding a preset temperature threshold, the module controller determines the at least one battery module including the battery with the temperature exceeding the temperature threshold to be abnormal.

5. The battery-system control method according to claim 1, wherein, based on SOC values of batteries included in the plurality of battery modules, when at least one battery module among the plurality of battery modules has an SOC value which is below a preset SOC threshold, the module controller determines that the at least one battery module having the SOC value which is below the preset SOC threshold to be abnormal.

6. The battery-system control method according to claim 1, wherein the load is a blade server.

7. The battery-system control method according to claim 1, wherein the batteries are lithium ion batteries or redox-flow batteries.

8. The battery-system control method according to claim 1, wherein each of the battery modules includes a temperature sensor.

9. The battery-system control method according to claim 1, wherein each of the battery modules includes a current detector.

10. A battery system comprising:
a plurality of battery modules capable of supplying power to a load; and
a module controller configured or programmed to control the plurality of battery modules to execute or stop supplying power; wherein
the module controller is configured or programmed to monitor, for each of the plurality of battery modules, whether the battery module is abnormal or normal, based on at least one of a voltage value of a battery included in the battery module, an SOC value indicating a state of charge of the battery, or a temperature of the battery;
in response to detection of an abnormality, the module controller is configured or programmed to select a battery module having the abnormality, without stopping the abnormal battery module;
after the selection, the module controller is configured or programmed to compare a current value of a current supplied to the load, with a total value of rated currents of all battery modules that are normal and that are supplying power to the load;
when the current value of the current supplied to the load is greater than the total value of the rated currents of all the battery modules that are supplying power to the load, the module controller is configured or programmed to perform control to stop all the plurality of battery modules; and
wherein, when the current value of the current supplied to the load is less than or equal to the total value of the rated currents of all the battery modules that are supplying power to the load, the module controller is configured or programmed to perform control to stop the abnormal battery module and not to stop the normal battery modules.

11. The battery system according to claim 10, wherein
when at least one battery module among the plurality of battery modules includes a battery with a voltage value below a preset first voltage threshold, the module controller is configured or programmed to determine the at least one battery module including the battery with the voltage value below the first voltage threshold to be abnormal; and
when it is determined that a battery module including a battery with a voltage value below a preset second voltage threshold larger than the first voltage threshold is present among the plurality of battery modules, if the current value of the current supplied to the load is less than or equal to the total value of the rated currents of all the battery modules other than the battery module including the battery with the voltage value below the first voltage threshold, the module controller is configured or programmed to perform control to stop the abnormal battery module and not to stop the normal battery modules.

12. A power supply system comprising:
a first power supply module;
a second power supply module; and
the battery system according to claim 11.

13. The power supply system according to claim 12, wherein the load is a blade server.

14. The battery system according to claim 10, wherein, based on temperatures of batteries included in the plurality of battery modules, when at least one battery module among the plurality of battery modules includes a battery with a temperature exceeding a preset temperature threshold, the module controller is configured or programmed to determine the at least one battery module including the battery with the temperature exceeding the temperature threshold to be abnormal.

15. The battery system according to claim 10, wherein, based on SOC values of batteries included in the plurality of battery modules, when at least one battery module among the plurality of battery modules has an SOC value which is below a preset SOC threshold, the module controller determines the at least one battery module with the SOC value below the preset SOC threshold to be abnormal.

16. The battery system according to claim 10, wherein the load is a blade server.

17. The battery system according to claim 10, wherein each of the battery modules includes a bi-directional DC-DC converter, a converter controller, a current detector, and a voltage detector.

18. The battery system according to claim 10, wherein the batteries are lithium ion batteries or redox-flow batteries.

19. The battery system according to claim 10, wherein each of the battery modules includes a temperature sensor.

20. The battery system according to claim 10, wherein each of the battery modules includes a current detector.

* * * * *